(12) United States Patent
Kameyama

(10) Patent No.: US 7,715,649 B2
(45) Date of Patent: May 11, 2010

(54) GENERATION AND ADJUSTMENT OF A LUMINANCE CORRECTION CURVE TO PREVENT SATURATION OF THE IMAGE DURING CONTRAST ENHANCEMENT

(75) Inventor: Hirokazu Kameyama, Kanagawa (JP)

(73) Assignee: Fujifilm Corporation, Tokyo (JP)

( * ) Notice: Subject to any disclaimer, the term of this patent is extended or adjusted under 35 U.S.C. 154(b) by 787 days.

(21) Appl. No.: 11/352,329

(22) Filed: Feb. 13, 2006

(65) Prior Publication Data
US 2006/0181618 A1  Aug. 17, 2006

(30) Foreign Application Priority Data
Feb. 14, 2005  (JP) .............................. 2005-035341

(51) Int. Cl.
*G06K 9/00* (2006.01)
*G09G 5/00* (2006.01)
*H04N 1/40* (2006.01)

(52) U.S. Cl. ........................ 382/274; 382/167; 345/617; 358/3.01

(58) Field of Classification Search ................. 382/162, 382/167, 274; 345/581, 589–591, 617; 358/1.9, 358/2.1, 3.01, 515–523
See application file for complete search history.

(56) References Cited

U.S. PATENT DOCUMENTS

| | | | | |
|---|---|---|---|---|
| 5,862,254 | A * | 1/1999 | Kim et al. | ................... 382/168 |
| 6,236,751 | B1 * | 5/2001 | Farrell | ....................... 382/168 |
| 6,771,814 | B1 * | 8/2004 | Nakajima | ................... 382/168 |
| 2002/0105662 | A1 * | 8/2002 | Patton et al. | ................ 358/1.9 |
| 2003/0117654 | A1 * | 6/2003 | Wredenhagen et al. | .... 358/3.21 |
| 2004/0061707 | A1 * | 4/2004 | Yoshida | ...................... 345/690 |
| 2005/0013506 | A1 * | 1/2005 | Yano | .......................... 382/274 |

FOREIGN PATENT DOCUMENTS

JP  2000-196890 A  7/2000

OTHER PUBLICATIONS

GNU Image Manipulation Program, version 2.2 source code. http://mirror.umoss.org/gimp/gimp/v2.2/gimp-2.2.0.tar.bz2 (only certain relevant portions provided).*
Satoshi Hosoi et al., Ethnicity Estimation with Facial Images, Proceedings of the Sixth IEEE International Conference on Automatic Face and Gesture Recognition (FGR'04), 2004, 6 pages, IEEE Computer Society.

* cited by examiner

*Primary Examiner*—Bhavesh M Mehta
*Assistant Examiner*—Barry Drennan
(74) *Attorney, Agent, or Firm*—Birch, Stewart, Kolasch & Birch, LLP

(57) ABSTRACT

A luminance conversion function calculating circuit calculates a luminance conversion function in order that a specific image contained in an image represented by image data to be processed will be made to have a desired brightness. Saturation of the specific image in a case where the applied image data has been subjected to a luminance correction based upon the calculated luminance conversion function is calculated and upper-limit saturation is calculated based upon an input value from the user. If the saturation of the specific image after the luminance correction thereof exceeds the upper-limit saturation, then a target dynamic range revising circuit narrows the range width of a target dynamic range that stipulates the luminance conversion function. The luminance conversion function is revised in a luminance conversion function revising circuit so as to have the narrowed range width.

8 Claims, 18 Drawing Sheets

$a : b = c : d$

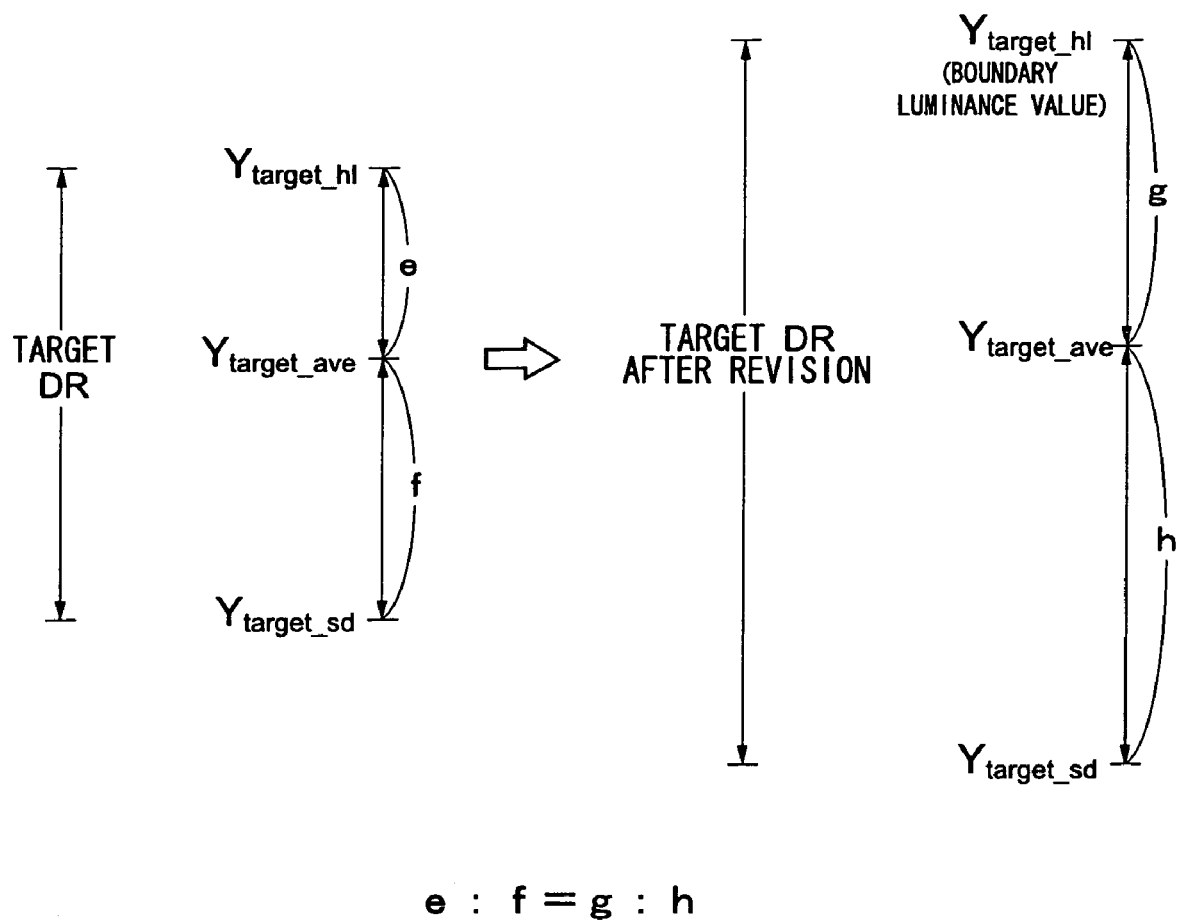

GENERATION AND ADJUSTMENT OF A LUMINANCE CORRECTION CURVE TO PREVENT SATURATION OF THE IMAGE DURING CONTRAST ENHANCEMENT

BACKGROUND OF THE INVENTION

1. Field of the Invention

This invention relates to an apparatus, method and program for creating a luminance conversion curve that is for the purpose of converting the brightness of an image.

2. Description of the Related Art

Digital image data is subjected to a variety of correction processing for the purpose of facilitating the viewing of and improving the quality of the image represented by the digital image data. A density conversion (luminance conversion, brightness conversion, tone conversion), which is one type of correction processing, generally corrects digital image data in such a manner that an image represented by the digital image data will be brightened if the image is dark and darkened if the image is bright.

The specification of Japanese Patent Application Laid-Open No. 2000-196890 (Patent Document 1) describes an image processing apparatus so adapted that if the density of the image of a subject is not within a target density range, the tone of the image is converted in such a manner that the density of the image of the subject will fall within the target density range in a state in which the densities of maximum- and minimum-density areas of the image are approximately maintained. A tone curve for the density correction is as illustrated in FIGS. 3 and 4 of the disclosed specification.

With the image processing apparatus described in Patent Document 1 (the density correction in accordance with the tone curve illustrated in FIGS. 3 and 4), the density of the image of the subject can be brought within the target density range and the densities of the maximum- and minimum-density areas of the image are not corrected. Since there is no decline in the density of highlight areas in the image and no rise in the density of shadow areas, the image can be prevented from becoming one giving a bland impression.

However, the tone curve not only stipulates the density (brightness and darkness) of the image after the correction but also is related to the saturation of the image. If the density correction is performed so as to further lower the density (raise the luminance) of the image of the subject when the density of the image of the subject is low (the luminance value is high) at the start, there are instances where the saturation of the image after the correction rises so much that the image obtained after the correction gives an impression far removed from that of the original image. There are also instances where the hue of the image after the correction differs from that of the original image.

Further, if the slope of the tone curve is extremely large, a portion of the image having a density that corresponds to a portion where the curve has a large slope undergoes a density correction that is too extreme (i.e., the image is converted to a high-contrast image).

SUMMARY OF THE INVENTION

Accordingly, an object of the present invention is to implement image-brightness correction processing that takes into consideration the saturation or hue of the image prevailing after the correction of the image.

Another object of the present invention is to implement image-brightness correction processing that takes into consideration high contrast (or low contrast) of the image prevailing after the correction of the image.

The present invention provides an apparatus and method for creating a luminance conversion curve (luminance conversion function) used in the brightness correction of image data. The brightness (luminance) of image data is corrected based upon the luminance conversion curve created by the apparatus and method of the invention. In this specification, a luminance value is used as data representing the brightness of an image. Since the luminance value can be uniquely converted to a density value, the term "luminance value" can be substituted for the term "density value" in this specification.

The luminance conversion curve created by the apparatus and method of the present invention stipulates output luminance values (corrected luminance values), which correspond to luminance values (input luminance values) possessed by respective ones of pixels that constitute an image represented by input image data, in correspondence with respective ones of luminance values (e.g., luminance values of 256 levels of from 0 to 255). The curve is defined by a look-up table in terms of the configuration of a memory in a computer. The luminance conversion curve created can be represented on a graph in which the input luminance values and output luminance values (converted luminance values) are plotted along the horizontal and vertical axes, respectively. The apparatus for creating the luminance conversion curve of the present invention can also be referred to as an apparatus for creating a look-up table or an apparatus for creating a density-conversion curve or tone curve.

According to a first aspect of the present invention, the foregoing objects are attained by providing an apparatus for creating a luminance conversion curve, comprising: specific image luminance value calculating means (device) for calculating a representative luminance value of a specific image contained in an image represented by applied image data, and a dynamic range that stipulates a bright luminance value and a dark luminance value of the specific image; target luminance value setting means (device) for setting a target representative luminance value prevailing after luminance correction of the representative luminance value, as well as a target dynamic range that stipulates a target bright luminance value prevailing after luminance correction of the bright luminance value and a target dark luminance value prevailing after luminance correction of the dark luminance value; luminance conversion curve calculating means (device) for calculating a luminance conversion curve, which stipulates output luminance values versus input luminance values, based upon the representative luminance value and dynamic range calculated by the specific image luminance value calculating means (device) and the target representative luminance value and target dynamic range set by the target image luminance value setting means (device); specific image saturation predicting means (device) for calculating a predicted saturation of the specific image in a case where a luminance correction has been applied to the applied image data, based upon the luminance conversion curve calculated by the luminance conversion curve calculating means (device); range width narrowing means (device) for narrowing range width of the target dynamic range if the predicted saturation of the luminance-corrected specific image calculated by the specific image saturation predicting means (device) exceeds an upper-limit saturation calculated based upon the target representative luminance value set by the target luminance value setting means (device); target dynamic range revising means (device) for revising the target dynamic range so as to have the range width narrowed by the range width narrowing means (device); and luminance conversion curve revising means (device) for revising the luminance conversion curve using the target dynamic range revised by the target dynamic range revising means (device).

According to the first aspect of the present invention, the foregoing objects are attained by providing a method of creating a luminance conversion curve, comprising the steps of: calculating a representative luminance value of a specific image contained in an image represented by applied image data, and a dynamic range that stipulates a bright luminance value and a dark luminance value of the specific image; setting a target representative luminance value prevailing after luminance correction of the representative luminance value, as well as a target dynamic range that stipulates a target bright luminance value prevailing after luminance correction of the bright luminance value and a target dark luminance value prevailing after luminance correction of the dark luminance value; calculating a luminance conversion curve, which stipulates output luminance values versus input luminance values, based upon the representative luminance value and dynamic range calculated and the target representative luminance value and target dynamic range set; calculating a predicted saturation of the specific image in a case where a luminance correction has been applied to the applied image data, based upon the luminance conversion curve calculated; narrowing range width of the target dynamic range if the predicted saturation of the luminance-corrected specific image calculated exceeds an upper-limit saturation calculated based upon the target representative luminance value set; revising the target dynamic range so as to have the narrowed range width; and revising the luminance conversion curve using the target dynamic range revised.

According to the first aspect of the present invention, the foregoing objects are attained by further providing a program for causing a computer to execute the above-described method of creating a luminance conversion curve (for causing a computer to function as an apparatus for creating a luminance conversion curve).

Assume that a specific image is contained in an image represented by applied image data (e.g., image data that has been read from film, image data that has been obtained by a digital camera, or image data that has been received over a network). The specific image is the principal part of the image of a subject in an image to be subjected to a brightness correction (luminance correction), e.g., the face image of a person. The specific image can be demarcated (partitioned, detected or extracted) from an image, which is represented by the applied data, based upon the shape or structure of the specific image, a feature of a characteristic element contained in the specific image, a color to be contained in the specific image, or some other information pertaining to the image.

The luminance conversion curve creating apparatus according to the present invention first creates a luminance conversion curve, which is for subjecting image data to luminance correction processing, using a plurality of luminance values relating to a specific image obtained from image data and a plurality of target luminance values that are set. If the luminance correction processing has been executed based upon the luminance conversion curve created and it is determined that the desired processing result cannot be obtained, then processing for revising the created luminance conversion curve is executed.

The luminance conversion curve is for converting a plurality of luminance values obtained based upon applied image data to a plurality of luminance values that will be set.

The plurality of luminance values obtained based upon the applied image data include a representative luminance value of the specific image contained in the image represented by the applied image data, as well as a bright luminance value and dark luminance value of the specific image. The average value, median value or mode of luminance values of pixels that constitute the specific image can be used as the representative luminance value. The luminance value having the largest value among the luminance values of the pixels constituting the specific image can be adopted as the bright luminance value, and luminance value having the smallest value among the luminance values of the pixels constituting the specific image can be adopted as the dark luminance value. The luminance range defined by the dark and bright luminance values is the dynamic range of the specific image.

By using a histogram regarding the luminance values of the specific image, a luminance value that occupies an area that is a prescribed percentage of the histogram measured from the maximum luminance value in the histogram may also be adopted as the bright luminance value of the specific image, and a luminance value that occupies an area that is a prescribed percentage of the histogram measured from the minimum luminance value in the histogram may also be adopted as the dark luminance value of the specific image.

Target luminance values corresponding to respective ones of the calculated representative luminance value, bright luminance value and dark luminance value of the specific image (namely a target representative luminance value corresponding to the representative luminance value after the luminance correction, a target bright luminance value corresponding to the bright luminance value after the luminance correction, and a target dark luminance value corresponding to the dark luminance value after the luminance correction) are set. The luminance range defined by the target dark luminance value and target bright luminance value is the target dynamic range.

The target representative luminance value and the target bright and dark luminance values (the target dynamic range) may be set by the user or it may be so arranged that any one or a plurality of target luminance values is set (input) and the remaining target luminance values are calculated automatically.

By way of example, a target representative luminance value corresponding to the representative luminance value and a range width (referred to as a "first range width" below) of a dynamic range between the target bright luminance value corresponding to the bright luminance value and the target dark luminance value corresponding to the dark luminance value are input (set) (input means is provided for this purpose). The target bright luminance value that corresponds to the bright luminance value and the target dark luminance value that corresponds to the dark luminance value (namely the target dynamic range) are calculated based upon the entered target representative luminance value and first range width and the representative luminance value, bright luminance value and dark luminance value of the specific image calculated based upon the image data.

In another embodiment, a target representative luminance value corresponding to the representative luminance value and a range width (referred to as a "second range width" below) of a dynamic range between the target representative luminance value and a target bright luminance value corresponding to the bright luminance value are input (set) (input means is provided for this purpose). The target bright luminance value that corresponds to the bright luminance value and the target dark luminance value that corresponds to the dark luminance value (namely the target dynamic range) are calculated based upon the entered target representative luminance value and second range width and the representative luminance value, bright luminance value and dark luminance value of the specific image calculated based upon the image data.

In yet another embodiment, a target representative luminance value corresponding to the representative luminance value and a range width (referred to as a "third range width" below) of a dynamic range between the target representative luminance value and a target dark luminance value corresponding to the dark luminance value are input (set) (input means is provided for this purpose). The target bright luminance value that corresponds to the bright luminance value and the target dark luminance value that corresponds to the dark luminance value (namely the target dynamic range) are calculated based upon the entered target representative luminance value and third range width and the representative luminance value, bright luminance value and dark luminance value of the specific image calculated based upon the image data.

In all of these three embodiments, it will suffice to calculate the target bright luminance value and target dark luminance value such that the ratio of the range width between the representative luminance value and dark luminance value to the range width of the dynamic range will agree with the ratio of the range width between the target representative luminance value and target dark luminance value to the range width of the target dynamic range, and such that the ratio of the range width between the representative luminance value and bright luminance value to the range width of the dynamic range will agree with the ratio of the range width between the target representative luminance value and target bright luminance value to the range width of the target dynamic range. A variation in the brightness of the specific image contained in the image represented by the applied image data can be maintained after the luminance correction.

A luminance conversion curve that stipulates output luminance values versus input luminance values is calculated based upon the representative luminance value and dynamic range that have been calculated based upon the applied image data and the target representative luminance value and target dynamic range that have been set.

In one embodiment, based upon a corresponding relationship between a plurality of luminance values (representative luminance value, bright luminance value and dark luminance value) obtained based upon image data and a plurality of target luminance values (target representative luminance value, target bright luminance value and target dark luminance value) that correspond to respective ones of the first-mentioned luminance values, a luminance conversion curve is calculated in which each of target luminance values that correspond to luminance values other than the first-mentioned plurality of luminance values are calculated by interpolation in such a manner that a smooth curve is formed in a case where a corresponding relationship between (a) the plurality of luminance values obtained based upon the image data and luminance values other than these plurality of luminance values and (b) target luminance values corresponding to these luminance values is expressed by curve.

For example, if we assume that a luminance value is represented by 8-bit data, then the luminance value can be expressed by any of 256 levels of 0 to 255. Target luminance values that correspond to respective ones of luminance values other than a plurality of luminance values (representative luminance value, bright luminance value and dark luminance value) calculated based upon the image data among the luminance values of 256 levels are calculated by interpolation. A spline interpolation method, nearest-neighbor method, linear method or cubic method, etc., can be utilized in interpolation processing that will furnish a smooth curve in a case where a relationship between (a) a plurality of luminance values obtained based upon image data and luminance values other than these plurality of luminance values and (b) target luminance values corresponding to these luminance values is expressed by a curve.

High contrast (or low contrast) of an image that contains a specific image after the luminance correction thereof conforms to the slope of the luminance conversion curve created. Since dark portions of the image become darker and bright portions brighter if the slope of the luminance conversion curve is enlarged, the corrected image becomes one that is well modulated (high in contrast). Conversely, since the difference between dark portions and bright portions of the image is diminished if the slope of the luminance conversion curve is reduced, the corrected image becomes one that is indistinct (low in contrast). The high contrast (low contrast) of a luminance-corrected specific image (the slope of the luminance conversion curve in the luminance range corresponding to the specific image) can be changed by the first, second or third range width mentioned above. More specifically, if large width (range) is set as the first, second or third range width, the difference in luminance between the target bright luminance and target dark luminance increases and so does the slope of the luminance conversion curve in the luminance range corresponding to the specific image. The specific image after the luminance correction, therefore, becomes high in contrast. Conversely, if small range is set as the first, second or third range width, the difference in luminance between the target bright luminance and target dark luminance decreases and so does the slope of the luminance conversion curve in the luminance range corresponding to the specific image. The specific image after the luminance correction, therefore, becomes low in contrast. A luminance-corrected specific image of high (or low) contrast conforming to user preference can be obtained by setting the target dynamic range (first, second or third range width). Since the target dynamic range is set as well as the correction value (target representative luminance value) of the representative luminance value, the corrected specific image will exhibit a high (or low) contrast conforming to user preference and a brightness (luminance value) that also conforms to user preference.

Parameters used in processing for calculating the luminance conversion curve are the luminance values [representative luminance value, bright luminance value and dark luminance value (dynamic range)] obtained from the image data to be processed and the target representative luminance value, target bright luminance value and target dark luminance value (target dynamic range) set by the user (or calculated based upon user settings), as mentioned above. Since the luminance conversion curve basically is for correcting the brightness of a specific image, which is contained in an image represented by image data to be processed, to a brightness desired by the user, it is required that the luminance values be calculated based upon the image data and that the luminance-corrected luminance values desired by the user be input (set).

If luminance correction processing is executed focusing solely upon luminance values before and after correction, there will be instances where the saturation of the specific image after the luminance correction thereof is high in comparison with the saturation of the specific image before the luminance correction. In particular, in a case where the luminance value of a specific image is high originally (i.e., if the specific image before the luminance correction is bright), the specific image after the luminance correction will give the impression of having a saturation that is too high if the target representative luminance value is set so as to brighten the specific image and the image data is subjected to the luminance correction in accordance with a luminance conversion curve obtained based upon this setting.

Accordingly, the apparatus for creating a luminance conversion curve according to the first aspect of the present invention takes special note of the saturation of a specific image after the luminance conversion thereof and executes processing to revise the created luminance conversion curve in prescribed cases.

On the basis of the luminance conversion curve that has been calculated, the predicted saturation of the specific image in a case where the applied image data has been corrected for luminance is calculated. For example, the average RGB values of the specific image are calculated and the average RGB values after execution of luminance correction processing (these shall be referred to as the "corrected average RGB values" below) are calculated using the luminance conversion curve. The predicted saturation is found based upon the corrected average RGB values calculated. A value obtained by subtracting the smallest value (any one of the R value, G value or B value) from the largest value (any one of the R value, G value or B value) among the corrected average RGB values calculated may be adopted as the predicted saturation (approximate) of the specific image after the luminance correction thereof.

It is determined whether the calculated predicted saturation of the specific image after the luminance correction thereof exceeds an upper-limit saturation calculated based upon the target representative luminance value that has been set.

The upper-limit saturation is calculated based upon the target representative luminance value set by the user. Preferably, the upper-limit saturation is made a comparatively large value if the target representative luminance value is comparatively small (e.g., a level of 180 or less among 256 levels) and is made gradually smaller in dependence upon the size of the luminance value if the target representative luminance value is comparatively large (e.g., a luminance value that exceeds 180).

If the predicted saturation of a luminance-corrected specific image exceeds the upper-limit saturation, then the range width of the target dynamic range is narrowed and the target dynamic range is revised so as to have the narrowed range width. The reason for this is that the saturation of the luminance-corrected specific image can be suppressed by narrowing the target dynamic range (this means reducing the target bright luminance value and enlarging the target dark luminance value).

In one embodiment, the range width narrowing means narrows the range width of the target dynamic range by multiplying the range width of the target dynamic range by a value that is the result of dividing the saturation of the specific image by the upper-limit saturation.

The revised target dynamic range is used to revise the luminance conversion curve.

In accordance with the first aspect of the present invention, the luminance conversion curve is revised in such a manner that the saturation of the luminance-corrected specific image is suppressed in a case where the predicted saturation of the luminance-corrected specific image exceeds the upper-limit saturation.

In an embodiment, the target dynamic range revising means revises the target dark luminance value and target bright luminance value, whereby the target dynamic range after revision will come to have a range width that has been narrowed by the range width narrowing means. The target dynamic range revising means revises the target dark luminance value and target bright luminance value such that the ratio of the range width between the target representative luminance value and target dark luminance value to the range width of the dynamic range will agree with the ratio of the range width between the target representative luminance value and revised target dark luminance value to the range width of the revised target dynamic range, and such that the ratio of the range width between the target representative luminance value and target bright luminance value to the range width of the target dynamic range will agree with the ratio of the range width between the target representative luminance value and revised target bright luminance value to the range width of the revised target dynamic range. A variation in the brightness of the specific image contained in the image represented by the applied image data can be maintained after the application of the luminance correction using the revised luminance conversion curve.

The apparatus, method and program for creating a luminance conversion curve can be defined as set forth below. With regard to the apparatus, an apparatus for creating a luminance conversion curve according to the present invention comprises: luminance conversion curve calculating means (device) for calculating a luminance conversion curve, which stipulates output luminance values versus input luminance values, based upon a luminance value obtained based upon a specific image contained in an image represented by applied image data and a parameter including a target luminance value prevailing after luminance correction of the luminance value; predicted color information calculating means (device) for calculating predicted color information of the specific image in a case where a luminance correction has been applied to the applied image data, based upon the luminance conversion curve calculated by said luminance conversion curve calculating means (device); and revising means (device) for revising the luminance conversion curve in such manner that said predicted color information falls within permitted limits (a range between upper-limit value and lower-limit value) calculated based upon the parameter in a case where said predicted color information calculated by said predicted color information calculating means (device) is not within the permitted limits. Color information includes saturation and hue. If the luminance correction has been executed based upon the luminance conversion curve and it is predicted that color information of the specific image after the luminance correction is not within the permitted limits, the luminance conversion curve is revised in such a manner that color information falls within the permitted limits. This makes it possible to prevent that color information of the specific image after the luminance correction will not depart from color information of the specific image before the luminance correction. By narrowing or widening the target dynamic range, the luminance conversion curve can be revised in such a manner that the predicted color information falls within the permitted limits.

According to a second aspect of the present invention, the foregoing objects are attained by providing an apparatus for creating a luminance conversion curve, comprising: specific image luminance value calculating means (device) for calculating a representative luminance value of a specific image contained in an image represented by applied image data, and a dynamic range that stipulates a bright luminance value and a dark luminance value of the specific image; target luminance value setting means (device) for setting a target representative luminance value prevailing after luminance correction of the representative luminance value, as well as a target dynamic range that stipulates a target bright luminance value prevailing after luminance correction of the bright luminance value and a target dark luminance value prevailing after luminance correction of the dark luminance value; luminance conversion curve calculating means (device) for calculating a luminance conversion curve, which stipulates output luminance values versus input luminance values, based upon the representative luminance value and dynamic range calculated by the specific image luminance value calculating means (device) and the target representative luminance value and target dynamic range set by the target image luminance value setting means (device); range width widening means (device) for widening range width of the target dynamic range in a case where a curve regarding a portion of the luminance conversion curve, which has been calculated by the luminance conversion curve calculating means (device), that exceeds the bright luminance value of the specific image is a downwardly convex curve; target dynamic range revising means for revising the target dynamic range so as to have the range width widened by the range width widening means (device); and luminance conversion curve revising means (device) for revising the luminance conversion curve using the target dynamic range revised by the target dynamic range revising means (device).

According to the second aspect of the present invention, the foregoing objects are attained by providing a method of creating a luminance conversion curve, comprising the steps of: calculating a representative luminance value of a specific image contained in an image represented by applied image data, as well as a dynamic range that stipulates a bright luminance value and a dark luminance value of the specific image; setting a target representative luminance value prevailing after luminance correction of the representative luminance value, as well as a target dynamic range that stipulates a target bright luminance value prevailing after luminance correction of the bright luminance value and a target dark luminance value prevailing after luminance correction of the dark luminance value; calculating a luminance conversion curve, which stipulates output luminance values versus input luminance values, based upon the representative luminance value and dynamic range calculated and the target representative luminance value and target dynamic range set; widening range width of the target dynamic range in a case where a curve regarding a portion of the calculated luminance conversion curve that exceeds the bright luminance value of the specific image is a downwardly convex curve; revising the target dynamic range so as to have the widened range width; and revising the luminance conversion curve using the target dynamic range revised.

According to the second aspect of the present invention, the foregoing objects are attained by further providing a program for causing a computer to execute the above-described method of creating a luminance conversion curve (for causing a computer to function as an apparatus for creating a luminance conversion curve).

In the second aspect of the present invention also a luminance conversion curve is calculated based upon a representative luminance value and dynamic range, which are calculated based upon applied image data, and a correction value (target representative luminance value) of a representative luminance value and target dynamic range of a specific image, these being set by the user.

In the second aspect of the present invention, the created luminance conversion curve is itself evaluated.

The portion of the luminance conversion curve evaluated in the second aspect of the invention is a portion that corresponds to luminance values that exceed the bright luminance value of the specific image. For example, if the target dynamic range set by the user is set to be very much smaller than the range width of the dynamic range obtained from the image data, there are instances where the curve of the portion that corresponds to luminance values greater than the bright luminance value of the specific image becomes a downwardly convex curve.

In accordance with the second aspect of the present invention, if the curve of a portion of the luminance conversion curve that corresponds to luminance values greater than the bright luminance value of the specific image is a downwardly convex curve, then the range width of the target dynamic range is widened and the target dynamic range is revised so as to have the widened range width. The slope of the curve of the portion corresponding to luminance values that exceed the bright luminance value of the specific image can be reduced by revising the luminance conversion curve in accordance with the target dynamic range that has been revised. This makes it possible to prevent the luminance-corrected image (the portion of the image that is brighter than the specific image) from being corrected to an extremely high contrast.

In the second aspect of the present invention as well it is preferred that the target bright luminance value and target dark luminance value be calculated, based upon the target representative luminance value input from the input unit and the first, second or third range width input from the input unit, such that the ratio of the range width between the representative luminance value and dark luminance value to the range width of the dynamic range will agree with the ratio of the range width between the target representative luminance value and target dark luminance value to the range width of the target dynamic range, and such that the ratio of the range width between the representative luminance value and bright luminance value to the range width of the dynamic range will agree with the ratio of the range width between the target representative luminance value and target bright luminance value to the range width of the target dynamic range, and that the entered target representative luminance value and target dynamic range that stipulates the calculated target bright luminance value and calculated target dark luminance value be set in the target luminance value setting means. Further, it is preferred that the revised target dynamic range be made to have a range width, which has been widened by the range widening means, by revising the target bright luminance value and target dark luminance value, and that the target bright luminance value and target dark luminance value be revised in the target dynamic range revising means such that the ratio of the range width between the target representative luminance value and dark luminance value to the range width of the target dynamic range will agree with the ratio of the range width between the target representative luminance value and revised target dark luminance value to the range width of the revised target dynamic range, and such that the ratio of the range width between the target representative luminance value and target bright luminance value to the range width of the target dynamic range will agree with the ratio of the range width between the target representative luminance value and revised target bright luminance value to the range width of the revised target dynamic range.

In an embodiment, the target bright luminance value is revised to a larger value in such a manner that the curve regarding the portion of the luminance conversion curve that exceeds the bright luminance value of the specific image will not come to have a downwardly convex curve. By so arranging it that the revised target dynamic range has a range width that has been widened by the range width widening means and so arranging it that the ratio of the range width between the target representative luminance value and dark luminance value to the range width of the target dynamic range will agree with the ratio of the range width between the target representative luminance value and revised target dark luminance value to the range width of the revised target dynamic range, and such that the ratio of the range width between the target representative luminance value and target bright luminance value to the range width of the target dynamic range will agree with the ratio of the range width between the target representative luminance value and revised target bright luminance value to the range width of the revised target dynamic range, the range width of the revised target dynamic range can be made larger than the target dynamic range before the correction if the target bright luminance value is revised to a larger value.

The apparatus, method and program for creating a luminance conversion curve according to the first and second aspects of the present invention can be defined broadly as set forth below. With regard to the apparatus, an apparatus for creating a luminance conversion curve according to the present invention comprises: specific image luminance value calculating means (device) for calculating a representative luminance value of a specific image contained in an image represented by applied image data, and a dynamic range that stipulates a bright luminance value and a dark luminance value of the specific image; target luminance value setting means (device) for setting a target representative luminance value prevailing after luminance correction of the representative luminance value, as well as a target dynamic range that stipulates a target bright luminance value prevailing after luminance correction of the bright luminance value and a target dark luminance value prevailing after luminance correction of the dark luminance value; luminance conversion curve calculating means (device) for calculating a luminance conversion curve, which stipulates output luminance values versus input luminance values, based upon the representative luminance value and dynamic range calculated by the specific image luminance value calculating means (device) and the target representative luminance value and target dynamic range set by the target image luminance value setting means (device); evaluating means (device) for directly or indirectly evaluating the luminance conversion curve calculated by the luminance conversion curve calculating means (device); range width revising means (device) for revising range width of the target dynamic range based upon the evaluation of the luminance conversion curve by the evaluating means (device); target dynamic range revising means (device) for revising the target dynamic range so as to have the range width revised by the range width revising means (device); and luminance conversion curve revising means (device) for revising the luminance conversion curve using the target dynamic range revised by the target dynamic range revising means (device). A direct evaluation of the luminance conversion curve includes evaluation of the luminance conversion curve itself (slope, downwardly directed convexity, etc.). An indirect evaluation of the luminance conversion curve includes an evaluation that is based upon a value (e.g., saturation, hue) obtained based upon the luminance conversion curve.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 18 illustrates the relationship between target dynamic range and widened target dynamic range prevailing after revision.

DESCRIPTION OF THE PREFERRED EMBODIMENTS

Preferred embodiments of the present invention will now be described with reference to the drawings.

Figure 1:
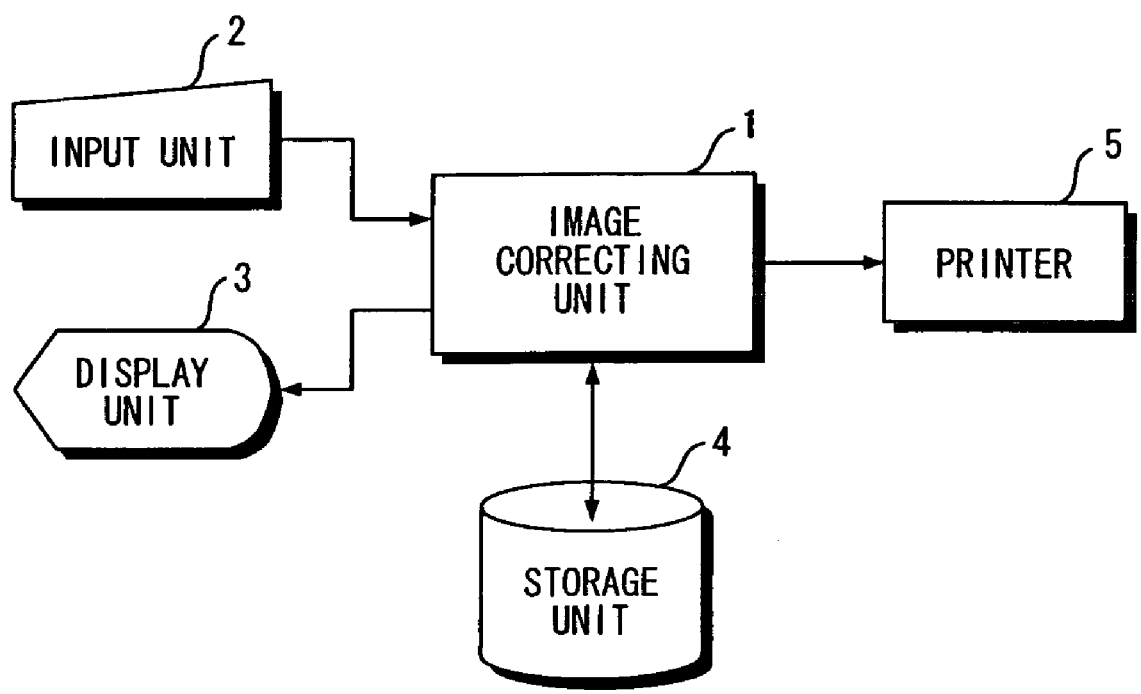
FIG. 1 is a block diagram illustrating the overall configuration of a digital printing system.
Figure 2:
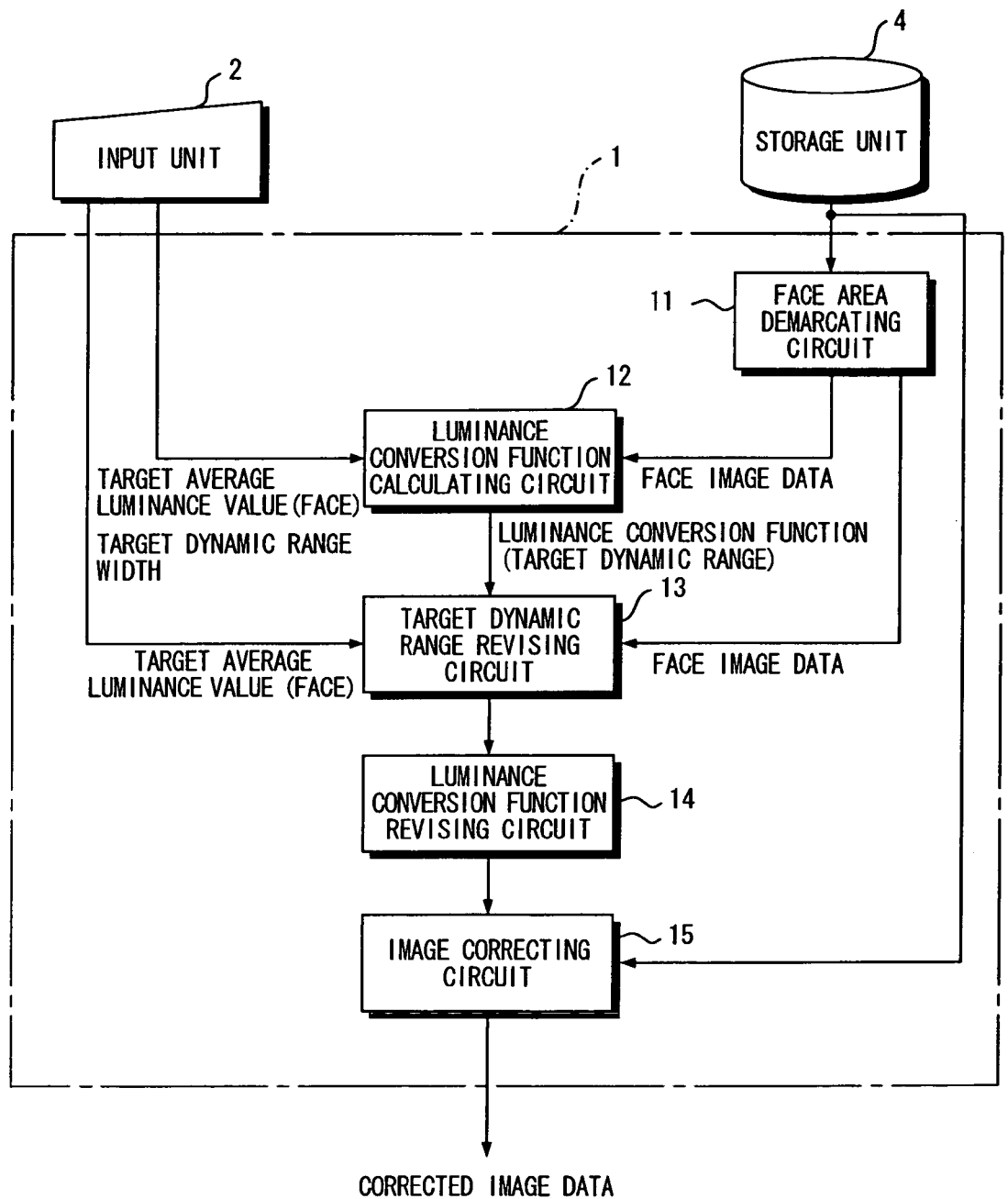
FIG. 2 is a block diagram illustrating the details of the electrical structure and the data flow of an image correcting unit.

FIG. 1 is a block diagram illustrating the overall configuration of a digital printing system. The digital printing system comprises an image correcting unit 1 and peripherals (input unit 2, display unit 3, storage unit 4 and printer 5) connected to the image correcting unit 1. FIG. 2 is a block diagram illustrating the details of the electrical structure of the image correcting unit 1 that forms the heart of the digital printing system. Among the peripherals shown in FIG. 1, the display unit 3 and printer 5 are deleted from the drawing of FIG. 2.

The image correcting unit 1 corrects the brightness (luminance value, which is any luminance value among 256 luminance values of 0 to 255) of every pixel of a portion (referred to as a "face image portion" below) representing a human face, which is contained in an image represented by applied image data, to a brightness (luminance value, which is any luminance value among 256 luminance values of 0 to 255) that conforms to a command from the user.

The input unit 2 (keyboard and mouse, etc.) connected to the image correcting unit 1 is used to input parameter(s) (described later), etc., for image correction processing. Displayed on the display screen of the display unit 3 are a screen for setting the parameter(s) input from the input unit 2 and images represented by image data before and after correction. Image data is stored in the storage unit (hard disk, memory card, CD-ROM, etc.) 4, and image data that has been read out of the storage unit 4 is subjected to image correction processing in the image correcting unit 1. The printer 5 prints the image, which is represented by the image data the correction thereof, on photographic printing paper or the like.

The image correcting unit 1 includes a face area demarcating circuit 11, a luminance conversion function calculating circuit 12, a target dynamic range revising circuit 13, a luminance conversion function revising circuit 14 and an image correcting circuit 15.

Image data that has been read out of the storage unit 4 connected to the image correcting unit 1 is subjected to an image correction (luminance conversion) in the image correcting circuit 15. The image correction processing executed in the image correcting circuit 15 is in accordance with a luminance conversion function (curve) (look-up table) that defines a corresponding relationship between input luminance values and output luminance values. The luminance conversion function is calculated in the luminance conversion function calculating circuit 12.

As will be described later, in prescribed cases the luminance conversion function that has been calculated in the luminance conversion function calculating circuit 12 is revised in the luminance conversion function revising circuit 14. In such case the image correction processing executed in the image correcting circuit 15 is performed in accordance with the luminance conversion function after its revision in the luminance conversion function revising circuit 14. In order to distinguish between the luminance conversion function calculated in the luminance conversion function calculating circuit 12 and the luminance conversion function after its revision in the luminance conversion function revising circuit 14, the luminance conversion function calculated in the luminance conversion function calculating circuit 12 shall be referred to as a "standard luminance conversion function" and the luminance conversion function after its revision in the luminance conversion function revising circuit 14 shall be referred to as an "applied luminance conversion function".

As mentioned above, the standard luminance conversion function is revised in the luminance conversion function revising circuit 14 in prescribed cases. Whether the standard luminance conversion function is to be revised and, in case of revision, how the standard luminance conversion function should be revised are decided by the target dynamic range revising circuit 13.

In this specification, there is a clear distinction between "dynamic range" and "range width of dynamic range" (also referred to as "dynamic range width" or "range width"). "Dynamic range" is stipulated by data representing two luminance values (maximum luminance value and minimum luminance value). The width between the two luminance values (i.e., the range width of dynamic range) is also specified by these two luminance values (maximum luminance value and minimum luminance value). On the other hand, "range width of dynamic range" does not go beyond expressing the width of dynamic range and does not express maximum and minimum luminance values.

Processing executed in the face area demarcating circuit 11, luminance conversion function calculating circuit 12, target dynamic range revising circuit 13, luminance conversion function revising circuit 14 and image correcting circuit 15 contained in the image correcting unit 1 will now be described.

In this embodiment, the standard luminance conversion function (or applied luminance conversion function) (the standard luminance conversion function is revised under prescribed conditions to generate the applied luminance conversion function, as set forth above) for subjecting image data to a luminance correction is calculated with particular regard to a face image portion contained in an image (referred to as an "original image" below) represented by image data (referred to as "original image data" below) that has been read out of the storage unit 4. More specifically, the image correcting unit 1 calculates the standard luminance conversion function (applied luminance conversion function) for correcting the brightness of the face image in the original image to a desired brightness (i.e., for performing a luminance conversion). The image correcting unit 1 has a face area demarcating circuit 11 in order to calculate the standard luminance conversion function (applied luminance conversion function) for correcting the brightness of the face image portion in the original image to a desired brightness. It is assumed that the original image represented by the image data to be subjected to correction processing contains an image portion representing a human face (namely a face image portion).

The original image data representing the original image containing the face image is read out of the storage unit 4 and applied to the face area demarcating circuit 11.

The face area demarcating circuit 11 demarcates the face image portion in the original image from other image portions (i.e., senses the face image portion or delimits the boundary). Various conventional or novel demarcating (detecting) techniques can be used in the processing to demarcate the face image portion contained in the original image. For example, the face image portion can be demarcated utilizing pattern matching with regard to image shape or image density, etc. A pattern prepared in advance is scanned across the original image and the matching score is calculated. An area in which a matching score greater than a prescribed value is determined to be a face image portion.

It may of course be so arranged that the user demarcates the face image portion of the original image from other image portions using the input unit 2 (mouse, etc.) (such an operation is manual demarcation of the face image). In this case the face area demarcating circuit 11 is not necessarily required in the image correcting unit 1.

The face area demarcating circuit 11 outputs image data (referred to as "face image data" below) representing the face image contained in the original image. The face image data that has been output from the face area demarcating circuit 11 is applied to the luminance conversion function calculating circuit 12 and target dynamic range revising circuit 13.

Figure 3:
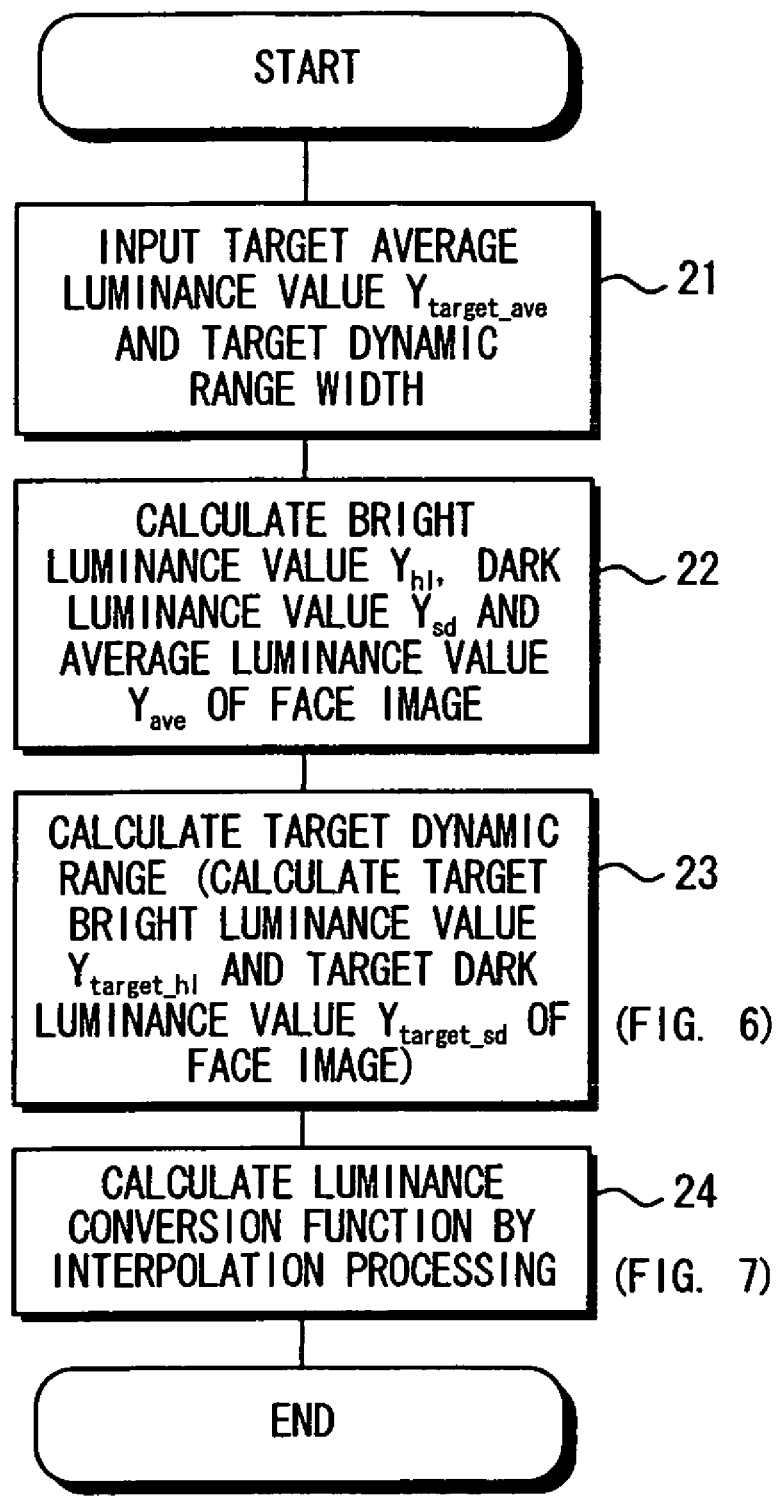
FIG. 3 is a flowchart illustrating the flow of processing in a luminance conversion function calculating circuit.

The processing executed by the luminance conversion function calculating circuit 12 will now be described. FIG. 3 is a flowchart illustrating the flow of processing executed by the luminance conversion function calculating circuit 12.

The face image data that has been output from the face area demarcating circuit 11 is applied to the luminance conversion function calculating circuit 12, as mentioned above. A target average luminance value $Y_{target\_ave}$ and target dynamic range width (target DR width) regarding the face image portion are further applied to the luminance conversion function calculating circuit 12 (step 21).

As will be described later, the target average luminance value $Y_{target\_ave}$ regarding the face image portion is a luminance value (target luminance value, correction value, output luminance value) resulting from luminance conversion of an average luminance value $Y_{ave}$ obtained from the face image.

The target dynamic range width (target DR width) is the range width of target dynamic range (range width between a target bright luminance value and target dark luminance value) regarding the face image, as will become evident from the description that follows.

Figure 4:
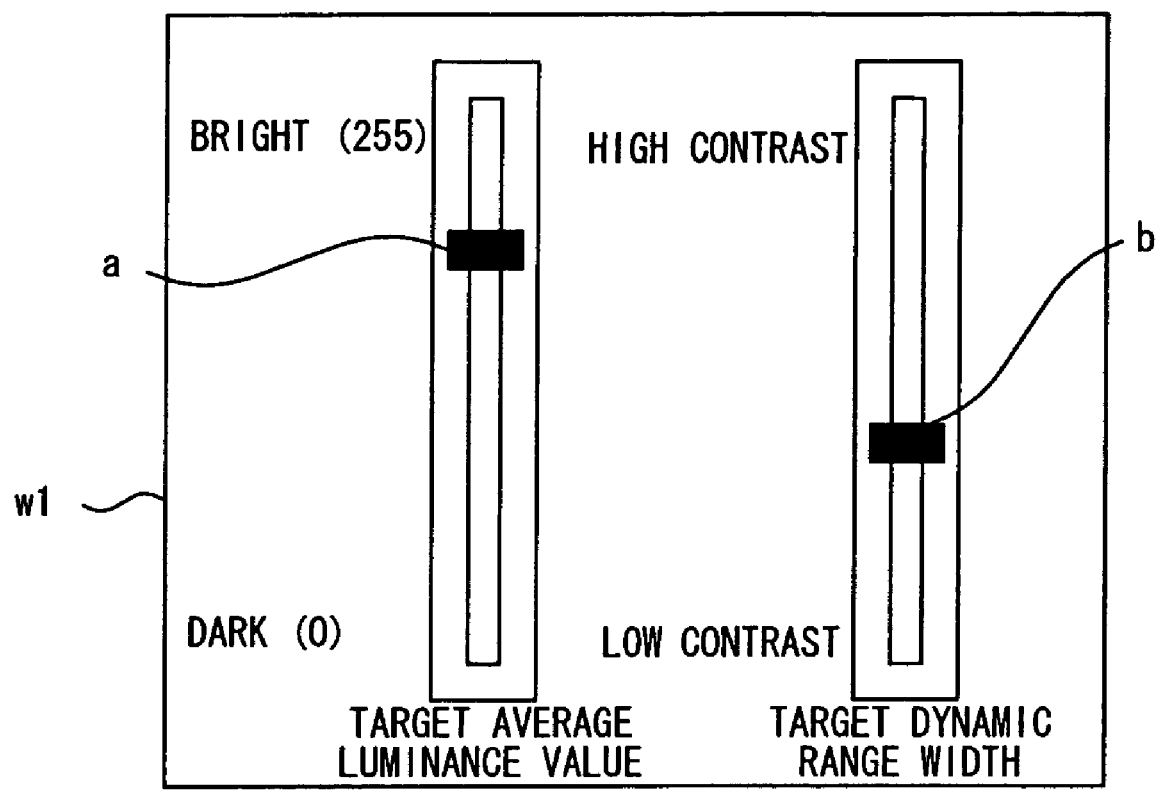
FIG. 4 illustrates an example of a screen for setting a target average luminance value and target dynamic range of a face image portion.

The target average luminance value $Y_{target\_ave}$ and target dynamic range (target DR width) are set by the user using the input unit 2 and display unit 3. FIG. 4 illustrates an example of a screen for setting the target average luminance value $Y_{target\_ave}$ and target dynamic range width (target DR width). A slide bar a is manipulated by the mouse to set the target average luminance value $Y_{target\_ave}$, and a slide bar b is manipulated by the mouse to set the target dynamic range width (target DR width).

The target dynamic range width (target DR width) is related to high contrast (or low contrast) of the face image prevailing after the luminance correction thereof. If a large value (width) is set as the target dynamic range width, the face image prevailing after the luminance correction thereof is corrected to a high contrast. If a small value is set as the target dynamic range width, then the face image prevailing after the luminance correction thereof is corrected to a low contrast.

The luminance conversion function calculating circuit 12 calculates a bright luminance value $Y_{hl}$, a dark luminance value $Y_{sd}$ and an average luminance value $Y_{ave}$ based upon the face image data (step 22).

The bright luminance value $Y_{hl}$ is the largest luminance value among the luminance values of each of the pixels constituting the face image, and the dark luminance value $Y_{sd}$ is the smallest luminance value among the luminance values of each of the pixels constituting the face image.

Figure 5:
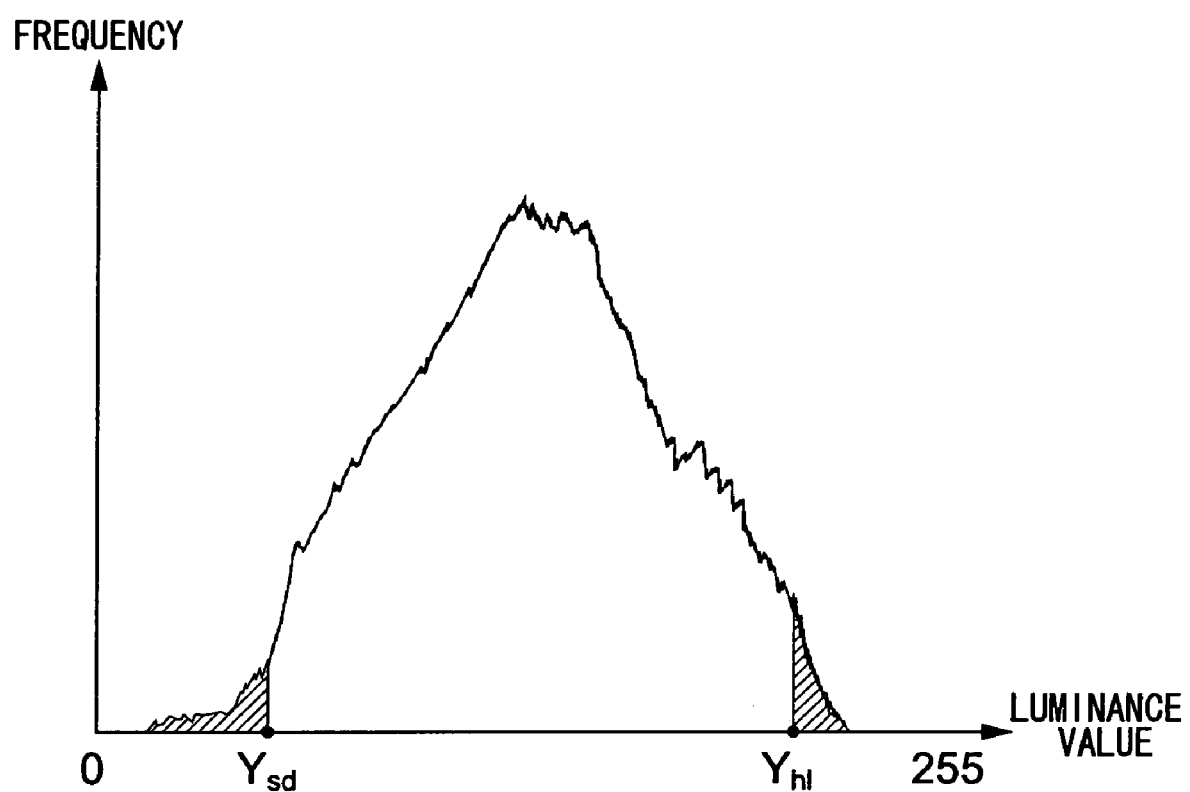
FIG. 5 is a histogram regarding luminance values of the face image portion.

Although the largest value and smallest value among the luminance values of each of the pixels constituting the face image can be adopted as the bright luminance value $Y_{hl}$ and dark luminance value $Y_{sd}$, there are instances where an unusual (inaccurate) luminance value will exist owing to the influence of noise or the like, depending upon the original image. In order to prevent unusual (inaccurate) luminance values from being construed as the bright luminance value $Y_{hl}$ and dark luminance value $Y_{sd}$ of the face image, a histogram may be created using the luminance values of each of the pixels constituting the face image, and a luminance value that occupies an area from the largest luminance value of the histogram to 1% of the histogram may be adopted as the bright luminance value $Y_{hl}$ and a luminance value that occupies an area from the smallest luminance value of the histogram to 1% of the histogram may be adopted as the dark luminance value $Y_{sd}$ (see FIG. 5). Even if a pixel having an unusual (inaccurate) luminance value exists, a bright luminance value $Y_{hl}$ or dark luminance value $Y_{sd}$ of the face image can be prevented from being decided based upon this pixel.

The average luminance value $Y_{ave}$ of the face image portion is the average value of luminance value of each of the pixels constituting the face image and is calculated according to Equation 1 below.

$$Y_{ave} = (\Sigma Y_i)/n \qquad \text{Eq. 1}$$

where Yi represents the luminance value of each pixel constituting the face image and n represents the number of pixels in the face image portion.

A median value or mode rather than the average value may be adopted as the average luminance $Y_{ave}$.

Control proceeds to calculation of target dynamic range (target DR) (step 23) after the bright luminance value $Y_{hl}$ and dark luminance value $Y_{sd}$ of the face image portion are calculated. As mentioned above, "dynamic range" signifies data representing two luminance values (maximum luminance value and minimum luminance value). The width between two luminance values (the range width of dynamic range) also is specified by two luminance values (maximum luminance value and minimum luminance value). In other words, processing for calculating the target dynamic range (target DR) signifies calculating a target bright luminance value $Y_{target\_hl}$ and a target dark luminance value $Y_{target\_sd}$ of the face image.

Figure 6:
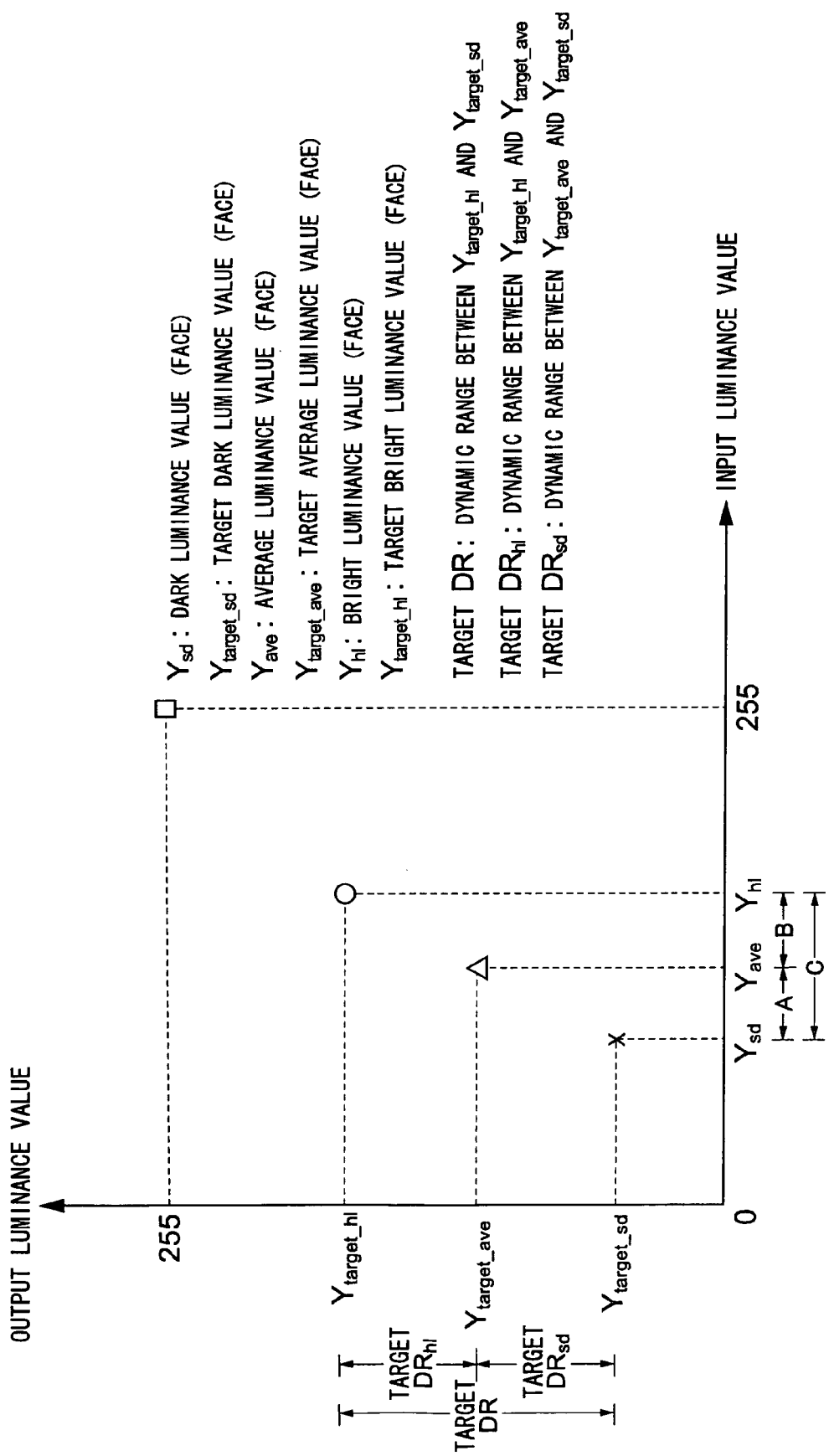
FIG. 6 illustrates the relationship between input luminance values and output luminance values (target luminance values)

Processing for calculating the target dynamic range (target DR) of the face image (processing for calculating the target bright luminance value $Y_{target\_hl}$ and target dark luminance value $Y_{target\_sd}$ of the face image) will be described with reference to FIG. 6. FIG. 6 is a coordinate diagram regarding luminance conversion in which input luminance values are plotted along the horizontal axis and output luminance values along the vertical axis.

The target bright luminance value $Y_{target\_hl}$, which is one of the luminance values that stipulate the target dynamic range (target DR), is calculated according to Equation 2 below.

$$Y_{target\_hl} = Y_{target\_ave} + \text{target } DR_{hl} \text{ width} \qquad \text{Eq. 2}$$

where "target $DR_{hl}$ width" represents range width of dynamic range between target bright luminance value and target average luminance value.

The target $DR_{hl}$ width (range width of dynamic range between the target bright luminance value and target average luminance value) used in Equation 2 is a value (luminance range width) obtained by applying the following ratio to the target DR width (range width of the target dynamic range) that has been set by the user: the ratio of the luminance difference (indicated at character B in FIG. 6) between the bright luminance value $Y_{hl}$ and average luminance value $Y_{ave}$ of the face image to the luminance difference (indicated at character C in FIG. 6) between the bright luminance value $Y_{hl}$ and dark luminance value $Y_{sd}$ of the face image.

As indicated by Equation 2, a value that is the result of adding the target $DR_{hl}$ width (range width of dynamic range between the target bright luminance value and target average luminance value) to the target average luminance value $Y_{target\_ave}$ of the input face image is adopted the target bright luminance value $Y_{target\_hl}$ of the face image.

The target dark luminance value $Y_{target\_sd}$ is calculated according to Equation 3 below.

$$Y_{target\_sd} = Y_{target\_ave} - \text{target } DR_{sd} \text{ width} \qquad \text{Eq. 3}$$

Where "target $DR_{sd}$ width represents range width of dynamic range between target average luminance value and target dark luminance value.

The target $DR_{sd}$ width (dynamic range width between the target average luminance value and target dark luminance value) used in Equation 3 is a value (luminance range width) obtained by applying the following ratio to the range width (target DR width) of the target dynamic range that has been set by the user: the ratio of the luminance difference (indicated at character A in FIG. 6) between the average luminance value $Y_{ave}$ and dark luminance value $Y_{sd}$ of the face image to the luminance difference (indicated at character C in FIG. 6) between the bright luminance value $Y_{hl}$ and dark luminance value $Y_{sd}$ of the face image.

As indicated by Equation 3, a value that is the result of subtracting the target $DR_{sd}$ width (range width of dynamic range between the target average luminance value and target dark luminance value) from the target average luminance value $Y_{target\_ave}$ of the input face image is adopted as the target dark luminance value $Y_{target\_sd}$ of the face image.

The target bright luminance value $Y_{target\_hl}$ and target dark luminance value $Y_{target\_sd}$ are calculated in accordance with Equations 2 and 3. That is, the target dynamic range (target DR) of the face image is obtained (step 23). The range width of the target dynamic range (target DR) takes on the target dynamic range width (target DR width) that has been set by the user.

In the processing described above, the target DR (target bright luminance value $Y_{target\_hl}$ and target dark luminance value $Y_{target\_sd}$) are calculated based upon the bright luminance value $Y_{hl}$, dark luminance value $Y_{sd}$ and average luminance value $Y_{ave}$, which are calculated based upon the image data representing the face image contained in the original image, and target average luminance value $Y_{target\_ave}$ and range width (target DR width) of the target dynamic range of the face image set by the user. However, it goes without saying that the target DR (target bright luminance value $Y_{target\_hl}$ and target dark luminance value $Y_{target\_sd}$) can be calculated even if it is arranged so as to allow the user to input (set) the range width (target $DR_{hl}$ width) between the target bright luminance value and target average luminance value or the range width (target $DR_{sd}$ width) between the target average luminance value and target dark luminance value instead of the range width (target DR width) of the target dynamic range.

By virtue of the processing thus far, five output luminance values (correction values) (0, $Y_{target\_sd}$, $Y_{target\_ave}$, $Y_{target\_hl}$ and 255) corresponding to respective ones of five input luminance values (0, $Y_{sd}$, $Y_{ave}$, $Y_{hl}$ and 255) among input luminance values of 256 levels from 0 to 255 are decided (see FIG. 6).

Figure 7:
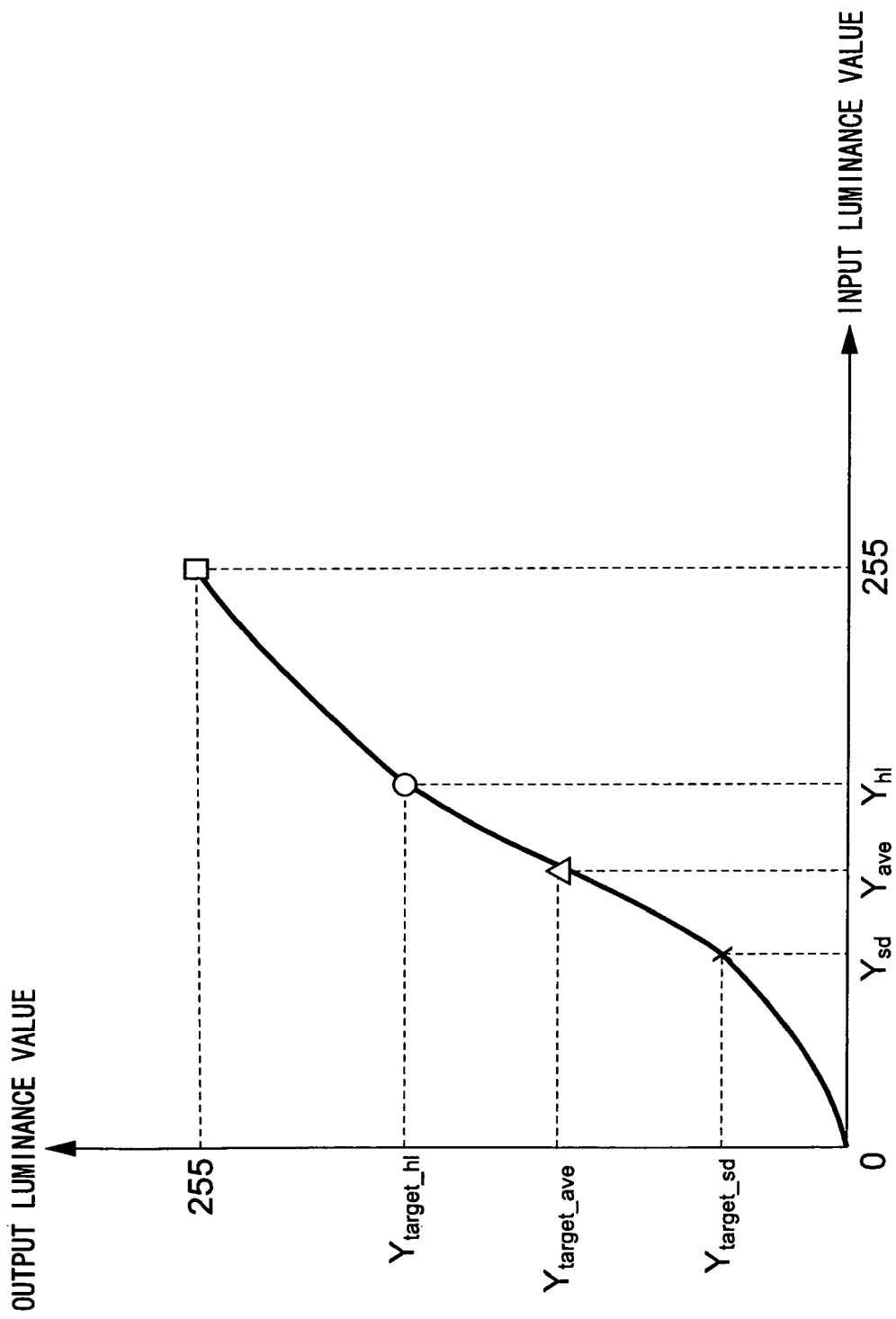
FIG. 7 illustrates the relationship between input luminance values and output luminance values (target luminance values) by a luminance conversion curve.

Output luminance values corresponding to respective ones of input luminance values other than the above-mentioned five input luminance values (0, $Y_{sd}$, $Y_{ave}$, $Y_{hl}$ and 255) are calculated by interpolation processing. Examples of such interpolation processing that can be utilized are a spline interpolation method, nearest-neighbor method, linear method or cubic method, etc. FIG. 7 illustrates the standard luminance conversion function calculated by interpolating the five points shown in FIG. 6 (the corresponding relationship between the five input luminance values and five output luminance values) using a cubic spline interpolation method.

Figure 8:
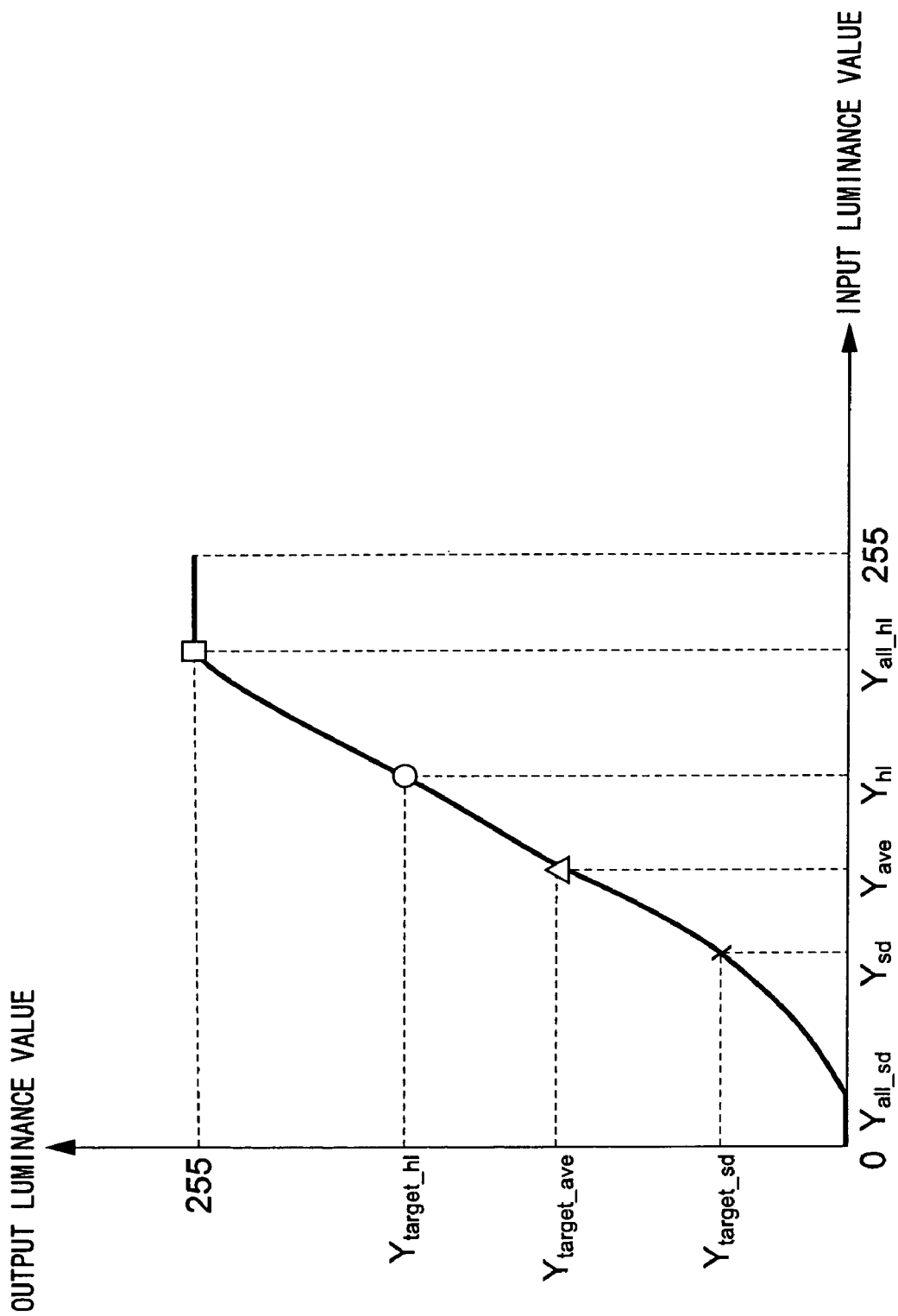
FIG. 8 illustrates another example of a luminance conversion curve indicating the relationship between input luminance values and output luminance values (target luminance values)

As mentioned above, (input luminance value, output luminance value)=(0,0), [dark luminance value ($Y_{sd}$), target dark luminance value ($Y_{target\_hl}$)], average luminance value ($Y_{ave}$), target average luminance value ($Y_{target\_ave}$)], [bright luminance value ($Y_{hl}$), target bright luminance value ($Y_{target\_hl}$)] and (255,255) (see FIGS. 6 and 7) may be used as the five points employed in interpolation processing, or (input luminance value, output luminance value)=[overall-image dark luminance value ($Y_{sd\_all}$), 0] may be used instead of (input luminance value, output luminance value)=(0,0), and (input luminance value, output luminance value)=[overall-image bright luminance value ($Y_{hl\_all}$), 255] may be used instead of (input luminance value, output luminance value)=(255,255). For example, a histogram of luminance values regarding the overall original image is calculated and the luminance value that occupies an area of 0.3% of the histogram from the largest luminance value in the histogram is adopted as the dark luminance value ($Y_{sd\_all}$) of the overall image, and the luminance value that occupies an area of 1% of the histogram from the smallest luminance value in the histogram is adopted as the bright luminance value ($Y_{hl\_all}$) of the overall image. FIG. 8 illustrates the standard luminance conversion function obtained using [overall-image dark luminance value ($Y_{sd\_all}$), 0] instead of (input luminance value, output luminance value)=(0,0) and using [overall-image bright luminance value ($Y_{hl\_all}$), 255] instead of (input luminance value, output luminance value)=(255,255).

There are occasions where the following problems arise if the original image data is subjected to a luminance correction using a standard luminance conversion function calculated based upon the bright luminance value $Y_{hl}$, dark luminance value $Y_{sd}$ and average luminance value $Y_{ave}$, which are calculated based upon the image data representing the face image contained in the original image, and target average luminance value $Y_{target\_ave}$ and range width (target DR width) of the target dynamic range of the face image set by the user:

(1) There are instances where saturation of the face image after it has been subjected to the luminance conversion becomes too high in comparison with the saturation of the face image prevailing before the luminance conversion.

Figure 9:
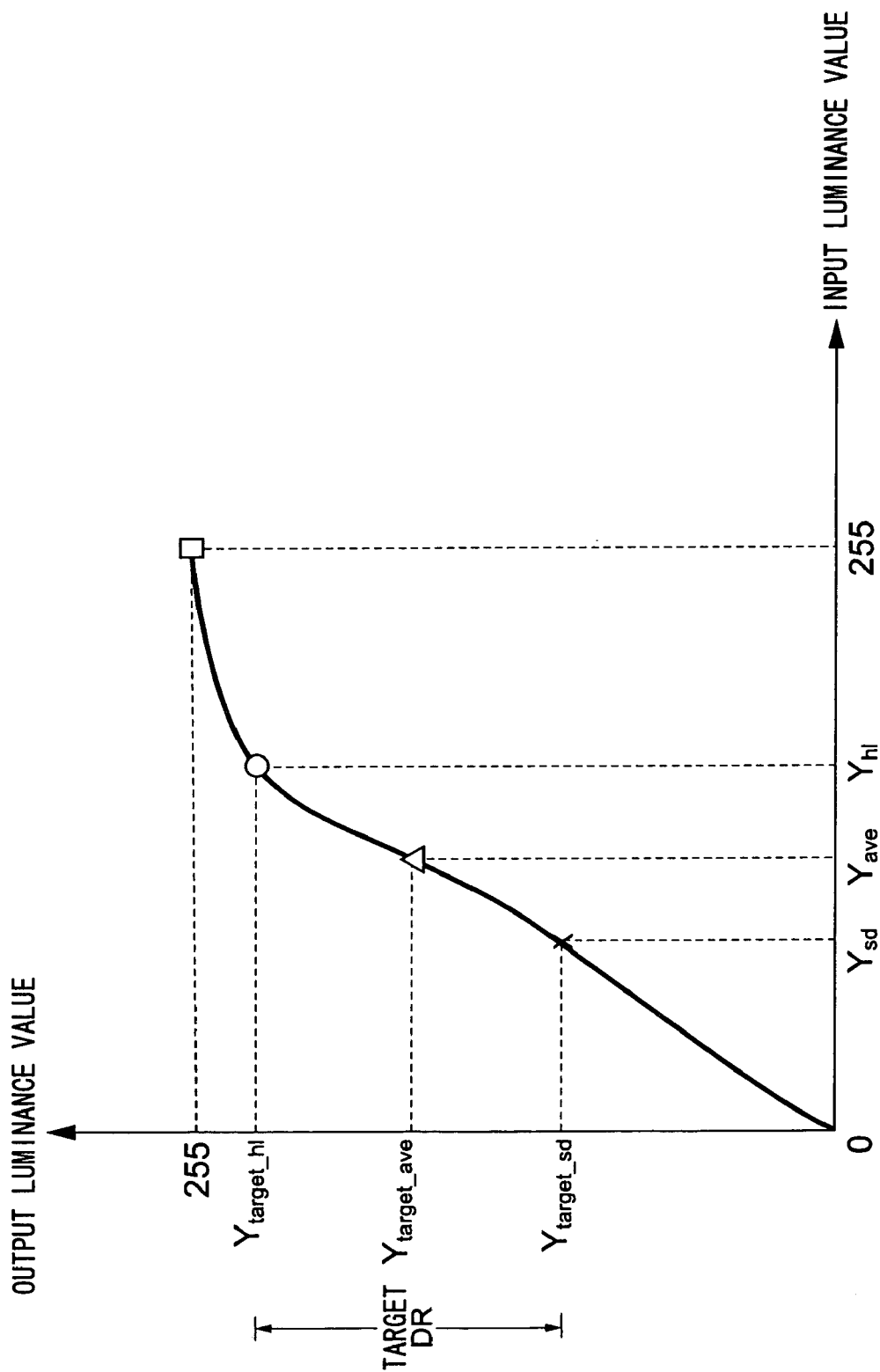
FIG. 9 illustrates another example of a luminance conversion curve indicating the relationship between input luminance values and output luminance values (target luminance values)

For example, there are cases where a comparatively high luminance value is input as the target average luminance value $Y_{target\_ave}$ of the face image, as illustrated in FIG. 9. In such case the target dynamic range (target bright luminance value $Y_{target\_hl}$ and target dark luminance value $Y_{target\_sd}$) also takes on comparatively high luminance values. When a luminance value is high, so is the saturation of the image. Consequently, if a comparatively high luminance value is input as the target average luminance value $Y_{target\_ave}$ of the face image, the saturation of the face image portion of the original image after the luminance conversion thereof will rise and the image will give an impression far removed from that of the original image.

Of the two parameters [target average luminance value $Y_{target\_ave}$ and target dynamic range width (target DR width)] set by the user, revising the user-set value (width) with regard to the target dynamic range width will not give a result far removed the user's wishes so long as the revision is not a major one. However, if the user-set value is altered with regard to the target average luminance value $Y_{target\_ave}$, there is a possibility that a luminance-converted image that does not satisfy the user's wishes will be obtained.

In order to prevent the saturation of the face image after the luminance conversion thereof from rising without changing (revising) the target average luminance value $Y_{target\_ave}$ of the face image that has been input by the user in a case where the target average luminance value $Y_{target\_ave}$ of the face image set by the user is high, it is contemplated to revise (change) the range width of the target dynamic range to a smaller width.

First of all, if original image data has been subjected to a luminance conversion based upon a standard luminance conversion function calculated based upon the target average luminance value $Y_{target\_ave}$ and target dynamic range (target DR width) of the face image set by the user, then, in a case where the saturation of the face image portion in the original image after the luminance conversion thereof will be too high, the target dynamic range revising circuit 13 executes processing for narrowing the range width (target DR width) of the target dynamic range (this processing shall be referred to as "processing for narrowing the range width of the target dynamic range" and will be described below in detail).

(2) There are instances where the contrast of an image portion in an original image having luminance values that exceed the bright luminance value $Y_{hl}$ of the face image is too high.

Figure 10:
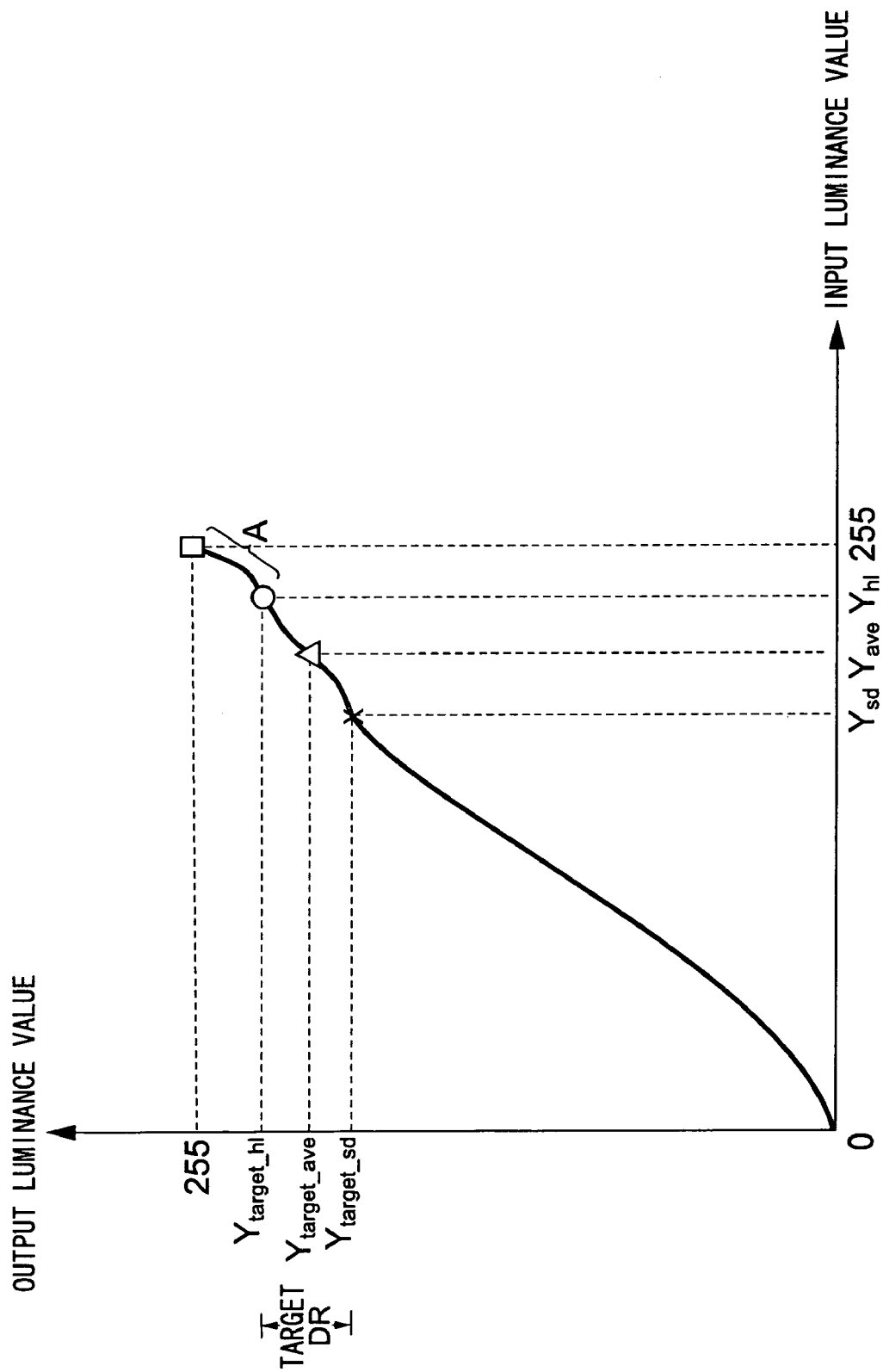
FIG. 10 illustrates another example of a luminance conversion curve indicating the relationship between input luminance values and output luminance values (target luminance values)

For example, there are cases where the range width (target DR width) of the target dynamic range input by the user is small (narrow). If the range width (target DR width) of the target dynamic range set by the user is narrow, as shown in FIG. 10, then the slope of the standard luminance conversion function corresponding to input luminance values that exceed the bright luminance value $Y_{hl}$ of the face image (namely the slope over the range indicated at character A in FIG. 10) becomes very large. In other words, the portion of the original image having luminance values exceeding the bright luminance value $Y_{hl}$ of the face image portion becomes very high in contrast and therefore this portion gives an impression far removed from that of the original image.

In order to prevent an image portion having luminance values exceeding the bright luminance value $Y_{hl}$ of the face image portion from being corrected to a high contrast without revising the target average luminance value $Y_{target\_ave}$ of the face image that has been input by the user, it is contemplated to widen the range width (target DR width) of the target dynamic range.

Second of all, in a case where the slope of the standard luminance conversion function corresponding to input luminance values that exceed the bright luminance value $Y_{hl}$, of the face image is large, the target dynamic range revising circuit 13 executes processing for widening the range width (target DR width) of the target dynamic range (this processing shall be referred to as "processing for widening the range width of the target dynamic range" and will be described below in detail).

The processing for narrowing the range width of the target dynamic range and the processing for widening the range width of the target dynamic range (both of these types of processing are executed in the target dynamic range revising circuit 13) will now be described.

Figure 11:
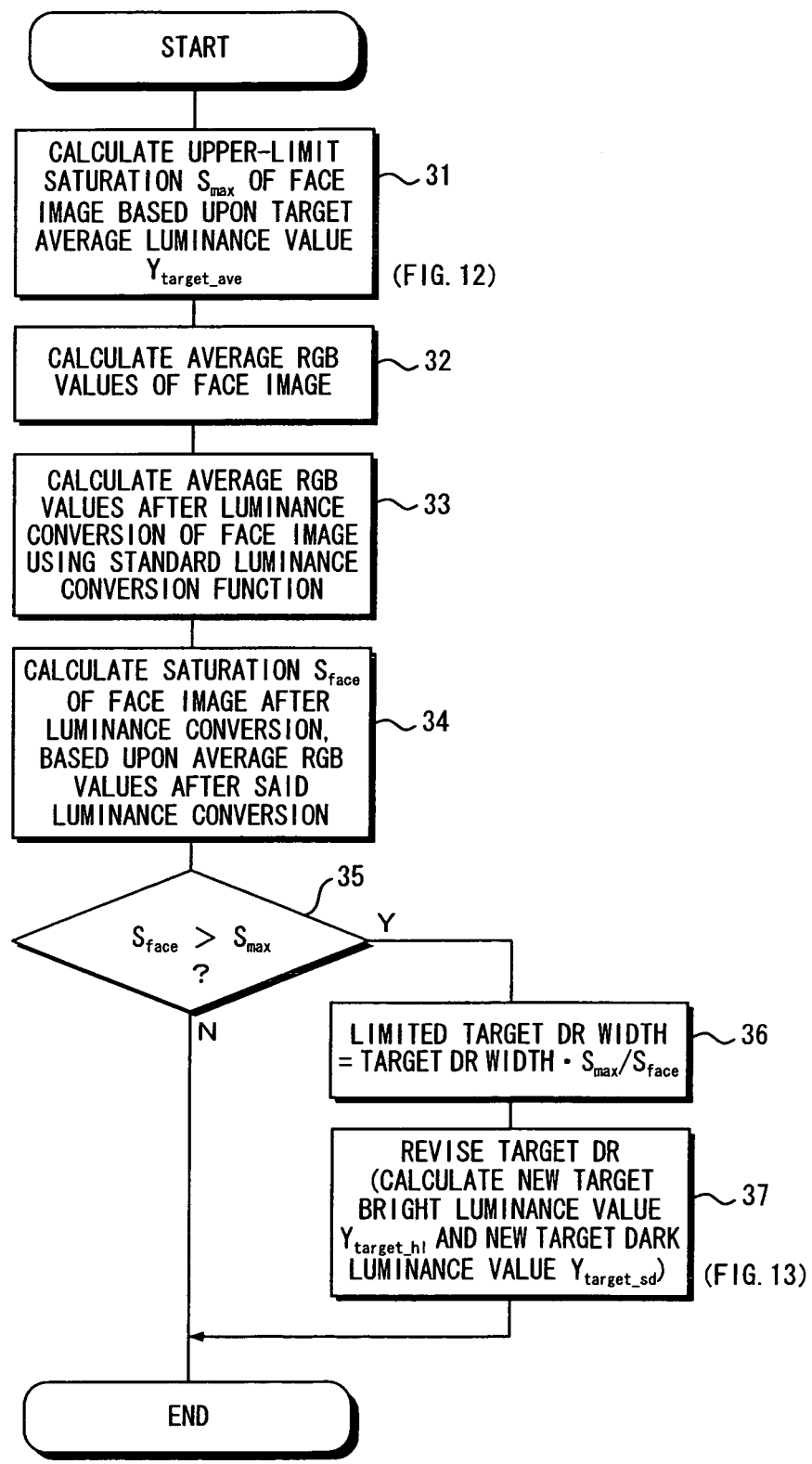
FIG. 11 is a flowchart illustrating the flow of processing for narrowing range width of target dynamic range (target DR width)

FIG. 11 is a flowchart illustrating the flow of processing for narrowing the range width (target DR width) of the target dynamic range, based upon a saturation.

As mentioned above, whether or not the range width (target DR width) of the target dynamic range is to be narrowed is decided based upon the saturation of the face image.

First, an upper-limit saturation $S_{max}$ of the face image is calculated based upon the target average luminance value $Y_{target\_ave}$ of the face image portion set by the user (step 31).

Figure 12:
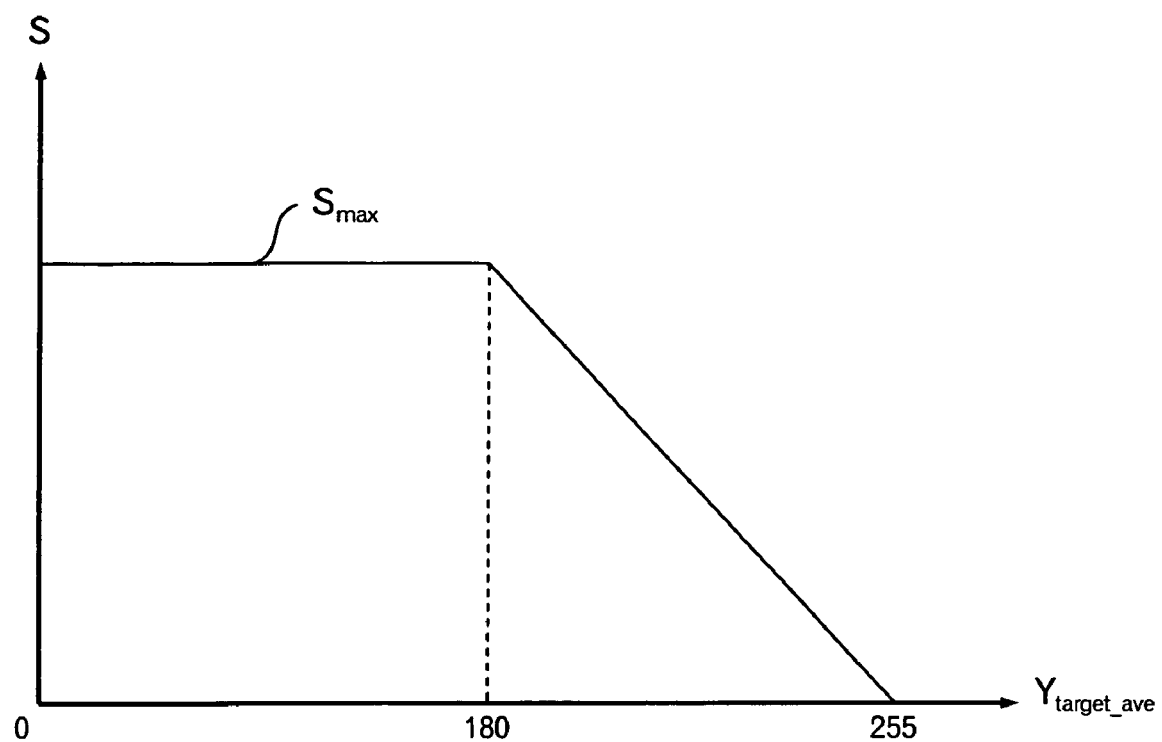
FIG. 12 is a diagram illustrating the relationship between a target average luminance value $Y_{target\_ave}$ of a face image portion and upper-limit saturation $S_{max}$ of the face image portion.

FIG. 12 is a graph illustrating the relationship between the target average luminance value $Y_{target\_ave}$ of a face image and the upper-limit saturation $S_{max}$ of the face image. The data representing the graph shown in FIG. 12 (data stipulating the relationship between target average luminance value $Y_{target\_ave}$ and upper-limit saturation $S_{max}$) has been stored beforehand in the target dynamic range revising circuit 13.

As shown in FIG. 12, the upper-limit saturation $S_{max}$ adopts a target average luminance value $Y_{target\_ave}$ of 180 as a reference level. The upper-limit saturation $S_{max}$ takes on a comparatively large constant value if $Y_{target\_ave}$ is lower than the reference level. If $Y_{target\_ave}$ is equal to or greater than the reference level, then the larger $Y_{target\_ave}$, the smaller the upper-limit saturation $S_{max}$. The upper-limit saturation $S_{max}$ becomes zero when the target average luminance value $Y_{target\_ave}$ is the maximum value (255).

The upper-limit saturation $S_{max}$ calculated in conformity with the target average luminance value $Y_{target\_ave}$ is compared with saturation (predicated saturation) $S_{face}$ of the face image portion prevailing after the application of luminance conversion processing, as will be described next. Saturation $S_{face}$ of the face image portion prevailing after application of luminance conversion processing is calculated as follows (steps 32 to 34):

First, the average RGB values of the face image are calculated (step 32). The average RGB values of the face image are values that take on the averages of the R, G and B values of each of the pixels that constitute the face image data.

Next, the average RGB values of the face image are converted using the standard luminance conversion function (step 33). The average RGB values of the face image after luminance conversion in a case where the original image data has been subjected to the luminance conversion using the luminance conversion function are calculated (these average RGB values shall be referred to as "converted average RGB values" below).

It may be so arranged that average values regarding respective ones of RGB may be calculated after the RGB values of all pixels constituting the face image have been subjected to conversion processing using the standard luminance conversion function.

The saturation (predicted saturation) $S_{face}$ of the face image after the luminance conversion is calculated using the converted average RGB values (step 34). The saturation $S_{face}$ of the face image after the luminance conversion thereof is calculated based upon the converted average RGB values. The saturation $S_{face}$ of the face image after the luminance conversion thereof may be calculated in approximate terms by subtracting the smallest value (any one of the R value, G value or B value) from the largest value (any one of the R value, G value or B value) among the converted average RGB values.

The upper-limit saturation $S_{max}$ of the face image and the saturation $S_{face}$ of the face image after the luminance conversion are compared (step 35).

If the saturation $S_{face}$ of the face image after the luminance conversion is equal to or less than the upper-limit saturation $S_{max}$ ("NO" at step 35), then it is decided that there is no need to narrow the range width (target DR width) of the target dynamic range. In such case the target dynamic range revising circuit 13 does not execute any particular processing.

On the other hand, in a case where the saturation $S_{face}$ of the face image after the luminance conversion is greater than the upper-limit saturation $S_{max}$ ("YES" at step 35), the saturation $S_{face}$ of the face image in the original image after the luminance conversion will exceed the upper-limit saturation $S_{max}$ if the original image is subjected to the luminance conversion using the standard luminance conversion function as is.

If the saturation $S_{face}$ of the face image after the luminance conversion is greater than the upper-limit saturation $S_{max}$ ("YES" at step 35), then the target dynamic range revising circuit 13 adopts a value, which is the result of multiplying the range width (target DR width) of the target dynamic range by $S_{max}/S_{face}$, as the new range width (referred to as the "limited target DR width") of the target dynamic range (step 36). Since $S_{face}$ is a value larger than $S_{max}$, the limited target DR width calculated is the result of narrowing the range width (target DR width) of the target dynamic range.

Figure 13:
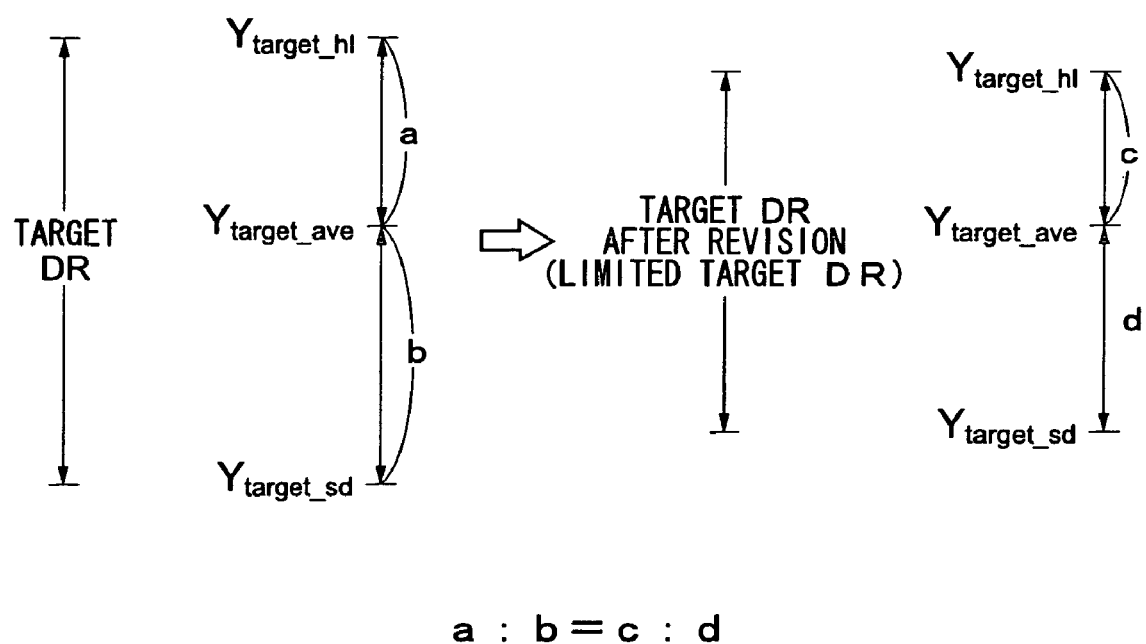
FIG. 13 illustrates the relationship between target dynamic range and narrowed target dynamic range prevailing after revision.

The target dynamic range is calculated based upon the limited target DR width (step 37). FIG. 13 schematically illustrates processing (the processing of step 36) for revising the target dynamic range (target DR).

When the limited target DR width is calculated, the target dynamic range revising circuit 13 executes processing to narrow the range width (target DR width) of the target dynamic range down to the limited target DR width calculated. At this time the target dynamic range revising circuit 13 calculates a new target bright luminance value $Y_{target\_hl}$ and new target dark luminance value $Y_{target\_sd}$ such that the target dynamic range (target DR) prevailing after revision will have the limited target DR width and such that the ratio of the range widths (indicated by characters a, c in FIG. 13) between the target average luminance value $Y_{target\_ave}$ and target bright luminance value $Y_{target\_hl}$ to the range widths (characters b, d in FIG. 13) between the target average luminance value $Y_{target\_ave}$ and target dark luminance value $Y_{target\_sd}$ before and after the revision will be maintained (that is, a:b=c:d). There is no change in the target average luminance value $Y_{target\_ave}$ before and after revision processing.

If the luminance conversion is thus performed based upon the standard luminance conversion function, the range width of the target dynamic range is narrowed and the new target bright luminance value $Y_{target\_hl}$ and new target dark luminance value $Y_{target\_sd}$ are calculated in a case where it is predicted that the saturation of the face image will be excessive.

With reference to FIG. 2, the revised target dynamic range that has been calculated in the target dynamic range revising circuit 13 (the new target bright luminance value $Y_{target\_hl}$ and new target dark luminance value $Y_{target\_sd}$) is supplied to the luminance conversion function revising circuit 14 from the target dynamic range revising circuit 13. The luminance conversion function revising circuit 14 uses the new target bright luminance value $Y_{target\_hl}$ and new target dark luminance value $Y_{target\_sd}$ to revise the standard luminance conversion function that has been calculated in the luminance conversion function calculating circuit 12 (i.e., to generate the applied luminance conversion function). The image correcting circuit 15 applies luminance correction processing to the image data, which has been read out of the storage unit 4, using the luminance conversion function (applied luminance conversion function) that has been revised in the luminance conversion function revising circuit 14. The image data that has undergone the luminance correction is output from the image correcting circuit 15 (image correcting unit 1). The saturation of the face image in the image represented by the corrected image data can be suppressed in comparison with the case where the luminance correction processing is executed using the standard luminance conversion function. Further, since the target average luminance value $Y_{target\_ave}$ set by the user is not revised, the wishes of the user relating to the brightness of the image are satisfied as is in the luminance correction processing that is based upon the applied luminance conversion function.

It may be so arranged in that in a case where the saturation of the face image obtained using the applied luminance conversion function is calculated and the calculated saturation is still greater than the upper-limit saturation $S_{max}$ mentioned above, the range width of the target dynamic range is narrowed further and the applied luminance conversion function is sought again. In the example described above, the new target bright luminance value $Y_{target\_hl}$ and new target dark luminance value $Y_{target\_sd}$ are calculated in such a manner that the ratio of the range widths (indicated by characters a, c in FIG. 13) between the target average luminance value $Y_{target\_ave}$ and target bright luminance value $Y_{target\_hl}$ to the range widths (characters b, d in FIG. 13) between the target average luminance value $Y_{target\_ave}$ and target dark luminance value $Y_{target\_sd}$ before and after the revision will be maintained (that is, a:b=c:d). However, it may be so arranged that only the new target bright luminance value $Y_{target\_hl}$ or new target dark luminance value $Y_{target\_sd}$ is calculated so as to satisfy the limited target DR width (revision of only character c or d in FIG. 13).

Figure 14:
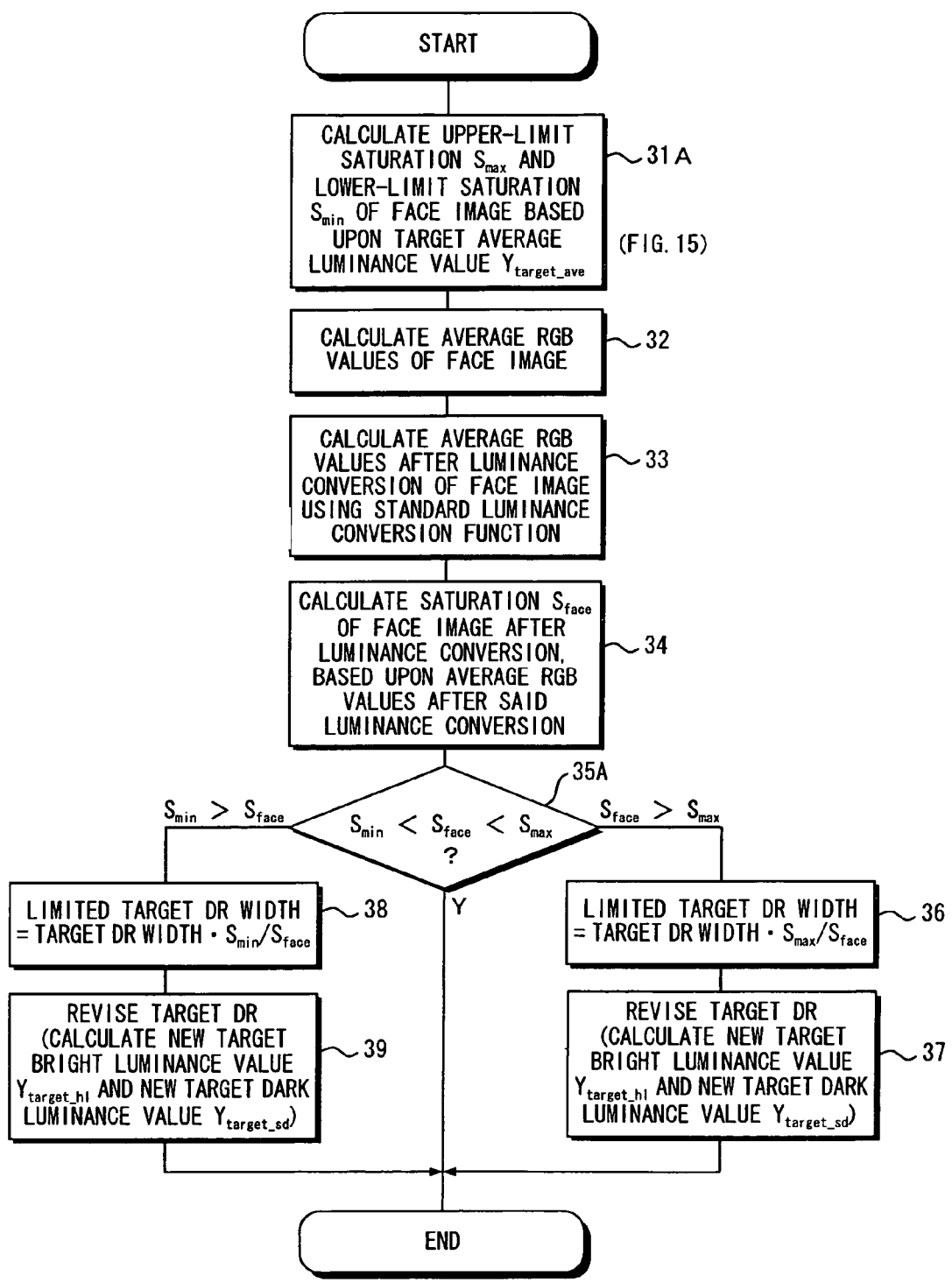
FIG. 14 is a flowchart illustrating the flow of processing for revising range width of target dynamic range (target DR width)
Figure 15:
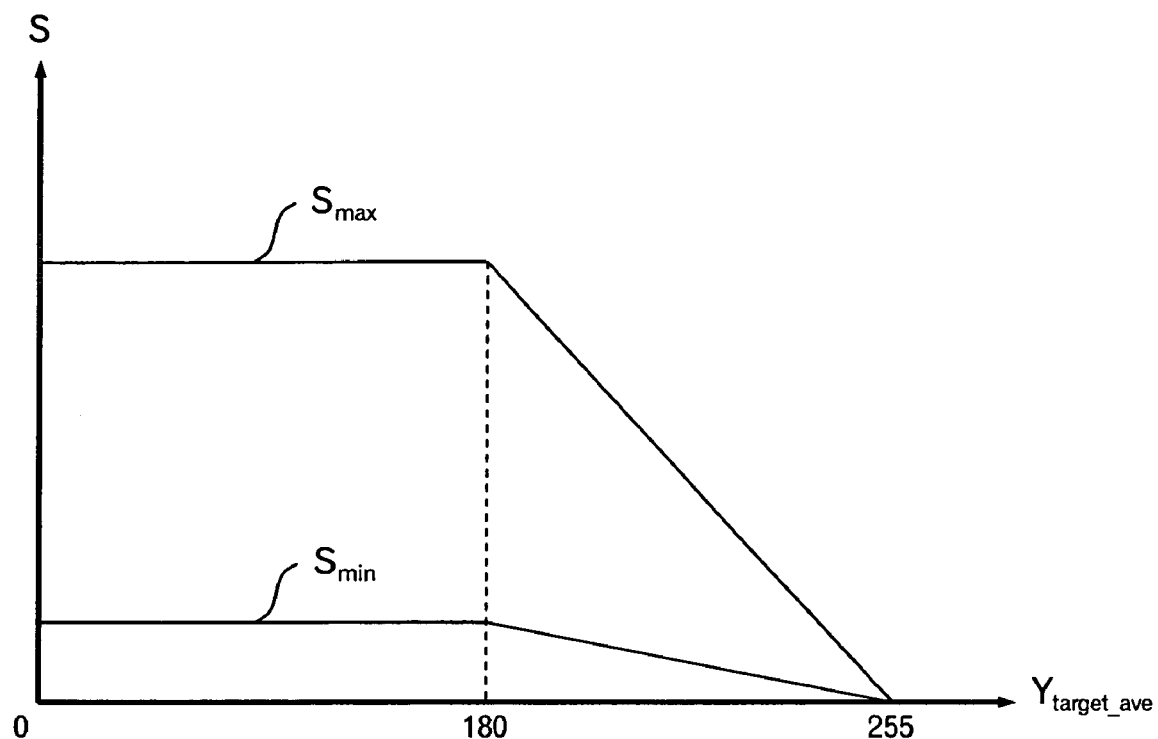
FIG. 15 is a diagram illustrating the relationship between a target average luminance value $Y_{target\_ave}$ of a face image portion and upper- and lower-saturations $S_{max}$, $S_{min}$ of the image portion.

It may be so arranged in that a lower-limit saturation $S_{min}$ is calculated besides the upper-limit saturation $S_{max}$, and the target DR is revised in such manner that the saturation $S_{face}$ of the face image after the luminance conversion falls within between the upper-limit saturation $S_{max}$ and the lower-limit saturation $S_{min}$. With reference to FIGS. 14 and 15, processing for revising the target DR using the upper-limit and lower-limit (i.e., to generate the applied luminance conversion function) will be described. In FIG. 14, processing steps identical with those of the flowchart shown in FIG. 13 are designated by like step numbers and need not be described again.

The lower-limit saturation $S_{min}$ and the upper-limit saturation $S_{max}$ of the face image are calculated based upon the target average luminance value $Y_{target\_ave}$ of the face image portion set by the user (step 31A). With reference to FIG. 15, the lower-limit saturation $S_{min}$ is decided as well as the upper-limit saturation $S_{max}$ depending on data stipulating the relationship between the target average luminance value $Y_{target\_ave}$ and the lower-limit saturation $S_{min}$.

It is judged whether the saturation $S_{face}$ of the face image after the luminance conversion is the value between the upper-limit saturation $S_{max}$ and the lower-limit saturation $S_{min}$ (step 35A).

If the saturation $S_{face}$ of the face image after the luminance conversion is a value between the upper-limit saturation $S_{max}$ and the lower-limit saturation $S_{min}$ ("YES" at step 35A), then the target dynamic range revising circuit 13 does not execute any particular processing.

As mentioned above, if the saturation $S_{face}$ of the face image after the luminance conversion is greater than the upper-limit saturation $S_{max}$ ("$S_{face}>S_{max}$" at step 35A), the limited target DR width which is the result of narrowing the range width (target DR width) of the target dynamic range is calculated. The revised target dynamic range (a new target bright luminance value $Y_{target\_hl}$ and new target dark luminance value $Y_{target\_sd}$) which have the limited target DR width is calculated (step 37). The standard luminance conversion function is revised based upon the revised target dynamic range (i.e., to generate the applied luminance conversion function).

On the other hand, if the saturation $S_{face}$ of the face image after the luminance conversion is smaller than the lower-limit saturation $S_{min}$ ("$S_{min}>S_{face}$" at step 35A), then the target dynamic range revising circuit 13 adopts a value, which is the result of multiplying the range width (target DR width) of the target dynamic range by $S_{min}/S_{face}$, as the new range width (limited target DR width) of the target dynamic range (step 38). Since $S_{min}$ is a value larger than $S_{face}$, the limited target DR width calculated is the result of widening the range width (target DR width) of the target dynamic range. The revised target dynamic range (a new target bright luminance value $Y_{target\_hl}$ and new target dark luminance value $Y_{target\_sd}$) which have the limited target DR width is calculated (step 39). The standard luminance conversion function is revised based upon the revised target dynamic range (i.e., to generate the applied luminance conversion function).

It may be so arranged in that in a case where the saturation of the face image obtained using the applied luminance conversion function is calculated and the calculated saturation is still greater than the upper-limit saturation $S_{max}$, or still smaller than the lower-limit saturation $S_{min}$, the range width of the target dynamic range is narrowed or widened further and the applied luminance conversion function is sought again.

It may be so arranged in that the range width of the target dynamic range is narrowed or widened based upon a hue instead of the saturation. In this case, an upper-limit hue instead of the upper-limit saturation and a lower-limit hue instead of the lower-limit saturation are stipulated respectively. It is judged whether a predicted hue of the face image portion after the luminance conversion is the value between the upper-limit hue and the lower-limit hue. If the predicted hue is not the value between the upper-limit hue and lower-limit hue, the range width of the target dynamic range is narrowed or widened in such a manner that the predicted hue falls within the range between the upper-limit hue and the lower-limit hue, and the applied luminance conversion function is calculated. For example, when assuming the hue of the face image portion before the luminance correction is θ, the range between the upper-limit hue and the lower-limit hue is θ±α. It is judged whether the predicted hue falls within this range.

Figure 16:
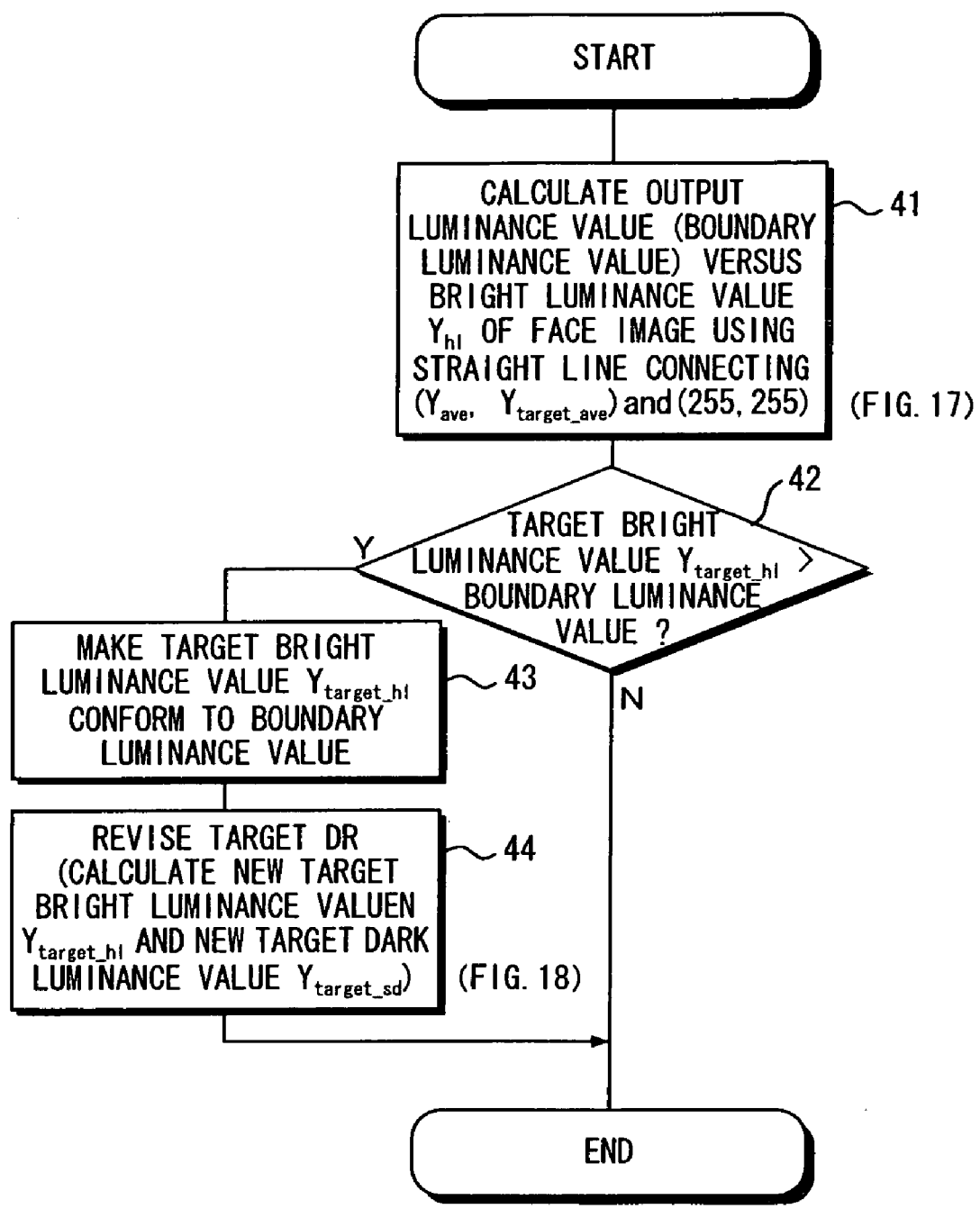
FIG. 16 is a flowchart illustrating the flow of processing for widening range width of target dynamic range (target DR width)

Processing for widening the range width of the target dynamic range based upon a luminance value will be described next. FIG. 16 is a flowchart illustrating the flow of processing for widening the range width of the target dynamic range. In the description of the flowchart, reference will be had to FIG. 17 (the diagram illustrating the relationship between input luminance values equal to or greater than the average luminance value $Y_{ave}$ and the output luminance values corresponding thereto) where appropriate.

First, an output luminance value (character C in FIG. 17) corresponding to the bright luminance value $Y_{hl}$ of the face image is calculated based upon a straight line connecting (input luminance value, output luminance value)=(face average luminance value $Y_{ave}$, target average luminance value $Y_{target\_ave}$) (indicated by Δ in FIG. 17) and (input luminance value, output luminance value)=(255,255) (indicated by □ in FIG. 17) (see character C). The output luminance value defined by character C shall be referred to as a "boundary luminance value" (step 41).

Figure 17:
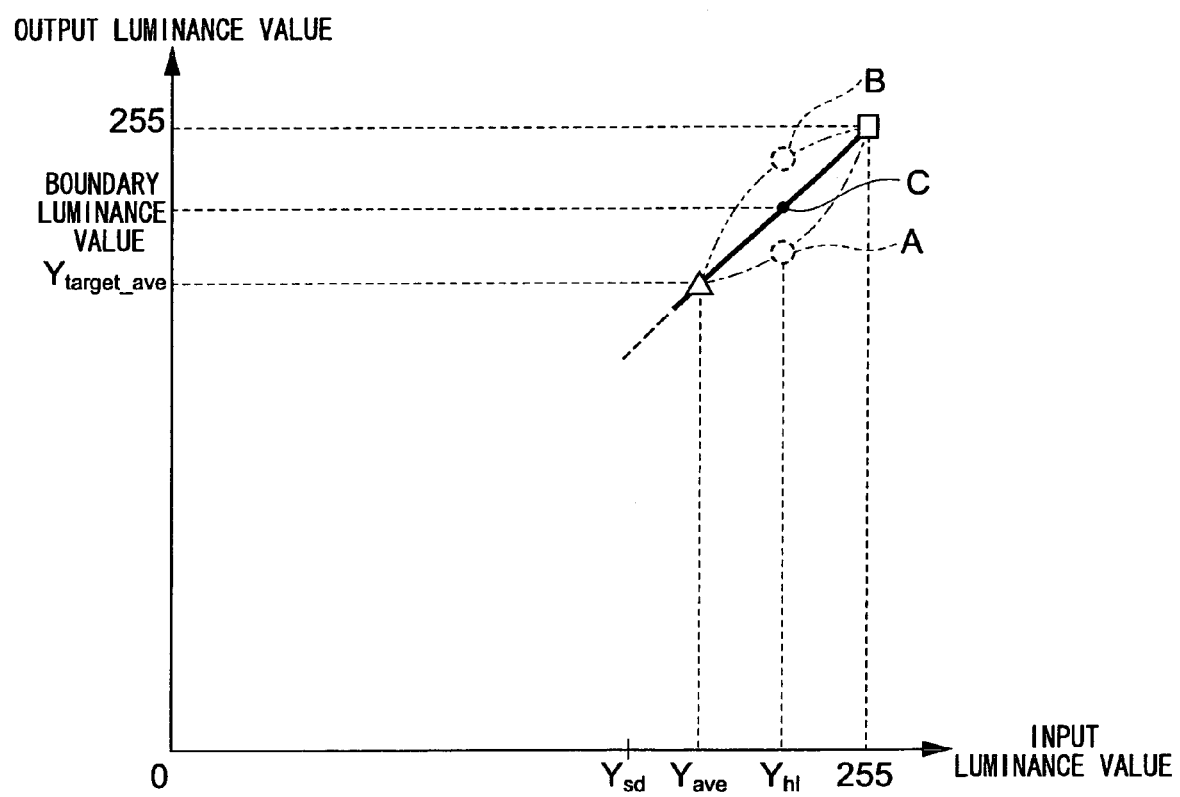
FIG. 17 illustrates conditions under which processing for calculating a boundary luminance value and processing for widening the range width of target dynamic range is executed.

If an output luminance value smaller than the boundary luminance value is assumed to be an output luminance value (corrected luminance value) that corresponds to the bright luminance value $Y_{hl}$ of the face image portion, then the slope of the luminance conversion function increases at luminance values that exceed the bright luminance value $Y_{hl}$, as indicated by the one-dot phantom line in FIG. 17. That is, if it is assumed that luminance conversion processing has been executed based upon the curve indicated by the one-dot phantom line in FIG. 17, then the image portion in the original image having luminance values that exceed the bright luminance value $Y_{hl}$ will be converted to a high contrast.

On the other hand, if an output luminance value equal to or greater than the boundary luminance value is assumed to be an output luminance value (corrected luminance value) that corresponds to the bright luminance value $Y_{hl}$ of the face image portion, then the slope of the luminance conversion function will not increase at luminance values that exceed the bright luminance value $Y_{hl}$, as indicated by the two-dot phantom line in FIG. 17. That is, even if luminance conversion processing has been executed, then the image portion in the original image having luminance values that exceed the bright luminance value $Y_{hl}$ will not be converted to a high contrast.

Accordingly, the target dynamic range revising circuit 13 compares the target bright luminance value $Y_{target\_hl}$ of the face image and the boundary luminance value and executes processing to make the target bright luminance value $Y_{target\_hl}$ of the face image conform to the boundary luminance value in a case where the target bright luminance value $Y_{target\_hl}$ of the face image is equal to or less than the boundary luminance value (i.e., the case indicated at character A in FIG. 17) ("YES" at step 42; step 43). On the other hand, the target dynamic range revising circuit 13 executes no particular processing in a case where the target bright luminance value $Y_{target\_hl}$ of the face image is greater than the boundary luminance value (i.e., the case indicated at character B in FIG. 17) ("NO" at step 42).

If processing for making the target bright luminance value $Y_{target\_hl}$ of the face image conform to the boundary luminance value has been executed, then the target dynamic range is revised (step 44). FIG. 18 schematically illustrates processing (the processing of step 44) for revising the target dynamic range (target DR).

If processing for making the target bright luminance value $Y_{target\_hl}$ of the face image conform to the boundary luminance value has been executed, then the target dynamic range revising circuit 13 makes the boundary luminance value the new target bright luminance value $Y_{target\_hl}$ of the face image and calculates the new target dark luminance value $Y_{target\_sd}$ regarding the face image in such a manner that the ratio of the range widths (indicated by characters e, g in FIG. 18) between the target average luminance value $Y_{target\_ave}$ and target bright luminance value $Y_{target\_hl}$ to the range widths (characters f, h in FIG. 18) between the target average luminance value $Y_{target\_ave}$ and target dark luminance value $Y_{target\_sd}$ before and after the revision will be maintained (that is, e:f=g: h). There is no change in the target average luminance value $Y_{target\_ave}$ before and after processing. It should be noted that it may be so arranged that the target dark luminance value $Y_{target\_sd}$ is not revised (revision of only character g in FIG. 18).

If the luminance conversion is thus performed based upon the standard luminance conversion function, then the new target bright luminance value $Y_{target\_hl}$ and new target dark luminance value $Y_{target\_sd}$ are calculated so as to widen the range width of the target dynamic range in a case where it is predicted that an image portion having luminance values that exceed the luminance values of the face image will take on a high contrast. The new target bright luminance value $Y_{target\_hl}$ and new target dark luminance value $Y_{target\_sd}$ are used to revise the standard luminance conversion function (to generate the applied luminance conversion function) in the luminance conversion function revising circuit 14, and the original image data is subjected to a luminance conversion in the image correcting circuit 15 based upon the applied luminance conversion function. In comparison with a case where luminance conversion processing is executed using the standard luminance conversion function, a portion having a brightness that exceeds the brightness of the face image in the image represented by the revised image data is prevented from being converted to a high contrast. Further, since the target average luminance value $Y_{target\_ave}$ set by the user is not revised, the wishes of the user relating to the brightness of the image are satisfied as is in the luminance correction processing that is based upon the applied luminance conversion function.

Thus, the image correcting unit 1 is so adapted that if a luminance conversion is performed based upon the standard luminance conversion function, the range width of the target dynamic range is narrowed in a case where the saturation of a face image after the luminance conversion will exceed the upper-limit saturation $S_{max}$ obtained based upon the target average luminance value $Y_{target\_ave}$ that is input by the user, and the standard luminance conversion function is revised in accordance with the narrowed range width of the target dynamic range. Thus a revised image that gives an impression of having a very high saturation for the face image after the luminance correction is prevented from being obtained. Further, it is possible to make the saturation (or the hue) of the face image after the luminance conversion surely falls within the range between the upper-limit saturation $S_{max}$ and the lower-limit saturation $S_{min}$ (or within the range between the upper-limit hue and the lower-limit hue). Further, in a case where a portion in the original image having luminance values that exceed the bright luminance value $Y_{hl}$ is converted to a high contrast, the range width of the target dynamic range is widened and the standard luminance conversion function is revised in accordance with the widened range width of the target dynamic range. Thus the impression given by a bright image portion in the original image after the luminance correction thereof is prevented from becoming much different from the impression of the original image. Further, even in a case where the range width of the target dynamic range has been narrowed or even in a case where it has been widened, a luminance-converted luminance value versus the average luminance value $Y_{ave}$ of the face image obtained from the original image in the revised standard luminance conversion function (applied luminance conversion function) is made to conform to the target average luminance value $Y_{target\_ave}$ that has been input from the input unit 2. The corrected image that has been subjected to luminance correction by the applied luminance conversion function will not depart from the wishes of the user relating to image brightness.

In the embodiment set forth above, a case where the target average luminance value $Y_{target\_ave}$ and target dynamic range (target DR width) are set by the user using the input unit 2 and display unit 3. However, it may be so arranged that a set of standard target average luminance value $Y_{target\_ave}$ and standard target dynamic range is stored beforehand in the storage device 4, and a user may correct them if necessary.

It may be so arranged that sets of standard target average luminance value $Y_{target\_ave}$ and standard target dynamic range corresponding to each of a plurality of races (e.g. Caucasoid, Mongoloid and Negroid) is stored in the storage device 4, the race (Caucasoid, Mongoloid or Negroid) is distinguished based upon data representing the face image portion, the set of standard target average luminance value $Y_{target\_ave}$ and standard target dynamic range is read based upon the result of the distinction from the storage device 4 and use it. The racial distinction processing based upon the data representing the face image can adopt the technology of the description for the following document.

S. Hosoi, E. Takikawa and M. Kawade, "Ethnicity Estimation with Facial Imaged", IEEE Conf. on Automatic Face and Gesture Recognition, pp195-200, 2004

Further, assume that an original image contains a plurality of face images and that the plurality of face images have been demarcated (detected) in the face area demarcating circuit 11. In such case it may be adopted the following the average luminance value; the average luminance value of the face image portion with the largest area; the average luminance value of the face image portion that is located at center or the nearest center of the original image to be processed; the average luminance value of the face image portion with the largest reliability; the average luminance value that is closest or furthest to the target average luminance value $Y_{target\_ave}$. It may be prepared the target average luminance values $Y_{target\_ave}$ for each race (Caucasoid, Mongoloid, Negroid, etc), and adopted the average luminance value that is the closest to the target average luminance value $Y_{target\_ave}$ of the race specified in advance. The average luminance value can be calculated utilizing all the face image portions.

In the embodiment set forth above, a case where the processing in the image correcting unit 1 is implemented by processing executed by hardware circuitry has been described. However, it may be so arranged that some or all of the processing by the hardware circuitry is implemented by a program.

As many apparently widely different embodiments of the present invention can be made without departing from the spirit and scope thereof, it is to be understood that the invention is not limited to the specific embodiments thereof except as defined in the appended claims.

What is claimed is:

1. An apparatus for creating a luminance conversion curve, comprising:

a main subject image portion partitioning device for partitioning a main portion of an image of a subject from an image represented by applied image data;

a main subject image luminance value calculating device for calculating a representative luminance value of the main portion of the image of the subject partitioned, and a dynamic range that stipulates a bright luminance value and a dark luminance value of the main portion of the image of the subject partitioned;

a target luminance value setting device for setting a target representative luminance value prevailing after luminance correction of the representative luminance value, as well as a target dynamic range that stipulates a target bright luminance value prevailing after luminance correction of the bright luminance value and a target dark luminance value prevailing after luminance correction of the dark luminance value;

a luminance conversion curve calculating circuit for calculating a luminance conversion curve, which stipulates output luminance values versus input luminance values, based upon the representative luminance value and dynamic range calculated by said main subject image luminance value calculating device and the target representative luminance value and target dynamic range set by said target image luminance value setting device;

a main subject image saturation predicting device for calculating a predicted saturation of the main subject image in a case where a luminance correction has been applied to the applied image data, based upon the luminance conversion curve calculated by said luminance conversion curve calculating circuit;

a range width narrowing device for narrowing range width of the target dynamic range if the predicted saturation of the luminance-corrected main subject image calculated by said main subject image saturation predicting device exceeds an upper-limit saturation calculated based upon the target representative luminance value set by said target luminance value setting device;

a target dynamic range revising device for revising the target dynamic range so as to have the range width narrowed by said range width narrowing device; and a luminance conversion curve revising device for revising the luminance conversion curve using the target dynamic range revised by said target dynamic range revising device, wherein said target dynamic range revising device revises the target dark luminance value and target bright luminance value, whereby the target dynamic range after revision will come to have a range width that has been narrowed by said range width narrowing device; and revises the target bright luminance value and target dark luminance value such that ratio of the range width between the target representative luminance value and target dark luminance value to the range width of the dynamic range will agree with the ratio of the range width between the target representative luminance value and revised target dark luminance value to the range width of the revised target dynamic range, and such that the ratio of the range width between the target representative luminance value and target bright luminance value to the range width of the target dynamic range will agree with the ratio of the range width between the target representative luminance value and revised target bright luminance value to the range width of the revised target dynamic range.

2. The apparatus according to claim 1, wherein said target luminance value setting device calculates the target bright luminance value and target dark luminance value, based upon a target representative luminance value input from an input unit, as well as a range width of target dynamic range or range width between the target representative luminance value and target bright luminance value or range width between the target representative luminance value and target dark luminance value input from the input unit, such that ratio of the range width between the representative luminance value and dark luminance value to the range width of the dynamic range will agree with ratio of the range width between the target representative luminance value and target dark luminance value to the range width of the target dynamic range, and such that ratio of the range width between the representative luminance value and bright luminance value to the range width of the dynamic range will agree with ratio of the range width between the target representative luminance value and target bright luminance value to the range width of the target dynamic range, and sets the target representative luminance value that has been input and a target dynamic range stipulating the target bright luminance value that has been calculated and the target dark luminance value that has been calculated.

3. The apparatus according to any one of claims 1 and 2, wherein said range width narrowing device narrows the range width of the target dynamic range by multiplying the range width of the target dynamic range by a value that is the result of dividing the saturation of the main portion of the image of the subject by the upper-limit saturation.

4. An apparatus for creating a luminance conversion curve, comprising:
a main subject image portion partitioning device for partitioning a main portion of an image of a subject from an image represented by applied image data;
a main subject image luminance value calculating device for calculating a representative luminance value of the main portion of the image of the subject partitioned, and a dynamic range that stipulates a bright luminance value and a dark luminance value of the main portion of the image of the subject partitioned;
a target luminance value setting device for setting a target representative luminance value prevailing after luminance correction of the representative luminance value, as well as a target dynamic range that stipulates a target bright luminance value prevailing after luminance correction of the bright luminance value and a target dark luminance value prevailing after luminance correction of the dark luminance value;
a luminance conversion curve calculating circuit for calculating a luminance conversion curve, which stipulates output luminance values versus input luminance values, based upon the representative luminance value and dynamic range calculated by said main subject image luminance value calculating device and the target representative luminance value and target dynamic range set by said target image luminance value setting device;
a range width widening device for widening range width of the target dynamic range in a case where a curve regarding a portion of the luminance conversion curve, which has been calculated by said luminance conversion curve calculating circuit, that exceeds the bright luminance value of the main subject image is a downwardly convex curve;
a target dynamic range revising device for revising the target dynamic range so as to have the range width widened by said range width widening device; and
a luminance conversion curve revising device for revising the luminance conversion curve using the target dynamic range revised by said target dynamic range revising device, wherein
said target dynamic range revising device revises the target dark luminance value and target bright luminance value, whereby the target dynamic range after revision will come to have a range width that has been widened by said range width widening device; and
revises the target bright luminance value and target dark luminance value such that ratio of the range width between the target representative luminance value and target dark luminance value to the range width of the dynamic range will agree with the ratio of the range width between the target representative luminance value and revised target dark luminance value to the range width of the revised target dynamic range, and such that the ratio of the range width between the target representative luminance value and target bright luminance value to the range width of the target dynamic range will agree with the ratio of the range width between the target representative luminance value and revised target bright luminance value to the range width of the revised target dynamic range.

5. The apparatus according to claim 4, wherein said target luminance value setting device calculates the target bright luminance value and target dark luminance value, based upon a target representative luminance value input from an input unit, as well as a range width of target dynamic range or range width between the target representative luminance value and target bright luminance value or range width between the target representative luminance value and target dark luminance value input from the input unit, such that ratio of the range width between the representative luminance value and dark luminance value to the range width of the dynamic range will agree with ratio of the range width between the target representative luminance value and target dark luminance value to the range width of the target dynamic range, and such that ratio of the range width between the representative luminance value and bright luminance value to the range width of the dynamic range will agree with ratio of the range width between the target representative luminance value and target bright luminance value to the range width of the target dynamic range, and sets the target representative luminance value that has been input and a target dynamic range stipulating the target bright luminance value that has been calculated and the target dark luminance value that has been calculated.

6. The apparatus according to claim 4, wherein said range width widening device revises the target bright luminance value to a larger value in such a manner that the curve regarding the portion of the luminance conversion curve, which has been calculated by said luminance conversion curve calculating circuit, that exceeds the bright luminance value of the main subject image will not come to have a downwardly convex curve.

7. A computer readable medium embodied with a program for creating a luminance conversion curve, said program causing a computer to execute the following processing:
- main subject image portion partitioning processing for partitioning a main portion of an image of a subject from an image represented by applied image data;
- main subject image luminance value calculating processing for calculating a representative luminance value of the main portion of the image of the subject partitioned, and a dynamic range that stipulates a bright luminance value and a dark luminance value of the main portion of the image of the subject partitioned;
- target luminance value setting processing for setting a target representative luminance value prevailing after luminance correction of the representative luminance value, as well as a target dynamic range that stipulates a target bright luminance value prevailing after luminance correction of the bright luminance value and a target dark luminance value prevailing after luminance correction of the dark luminance value;
- luminance conversion curve calculating processing for calculating a luminance conversion curve, which stipulates output luminance values versus input luminance values, based upon the representative luminance value and dynamic range calculated by said main subject image luminance value calculating processing and the target representative luminance value and target dynamic range set by said target image luminance value setting processing;
- main subject image saturation predicting processing for calculating a predicted saturation of the main subject image in a case where a luminance correction has been applied to the applied image data, based upon the luminance conversion curve calculated by said luminance conversion curve calculating processing;
- range width narrowing processing for narrowing range width of the target dynamic range if the predicted saturation of the luminance-corrected main subject image calculated by said main subject image saturation predicting processing exceeds an upper-limit saturation calculated based upon the target representative luminance value set by said target luminance value setting processing;
- target dynamic range revising processing for revising the target dynamic range so as to have the range width narrowed by said range width narrowing processing; and
- luminance conversion curve revising processing for revising the luminance conversion curve using the target dynamic range revised by said target dynamic range revising processing, wherein
- said target dynamic range revising processing revises the target dark luminance value and target bright luminance value, whereby the target dynamic range after revision will come to have a range width that has been narrowed by said range width narrowing processing; and
- revises the target bright luminance value and target dark luminance value such that ratio of the range width between the target representative luminance value and target dark luminance value to the range width of the dynamic range will agree with the ratio of the range width between the target representative luminance value and revised target dark luminance value to the range width of the revised target dynamic range, and such that the ratio of the range width between the target representative luminance value and target bright luminance value to the range width of the target dynamic range will agree with the ratio of the range width between the target representative luminance value and revised target bright luminance value to the range width of the revised target dynamic range.

8. A computer readable medium embodied with a program for creating a luminance conversion curve, said program causing a computer to execute the following processing:
- main subject image portion partitioning processing for partitioning a main portion of an image of a subject from an image represented by applied image data;
- main subject image luminance value calculating processing for calculating a representative luminance value of the main portion of the image of the subject partitioned, and a dynamic range that stipulates a bright luminance value and a dark luminance value of the main portion of the image of the subject partitioned;
- target luminance value setting processing for setting a target representative luminance value prevailing after luminance correction of the representative luminance value, as well as a target dynamic range that stipulates a target bright luminance value prevailing after luminance correction of the bright luminance value and a target dark luminance value prevailing after luminance correction of the dark luminance value;
- luminance conversion curve calculating processing for calculating a luminance conversion curve, which stipulates output luminance values versus input luminance values, based upon the representative luminance value and dynamic range calculated by said main subject image luminance value calculating processing and the target representative luminance value and target dynamic range set by said target image luminance value setting processing;
- range width widening processing for widening range width of the target dynamic range in a case where a curve regarding a portion of the luminance conversion curve, which has been calculated by said luminance conversion curve calculating processing, that exceeds the bright luminance value of the main subject image is a downwardly convex curve;
- target dynamic range revising processing for revising the target dynamic range so as to have the range width widened by said range width widening processing; and
- luminance conversion curve revising processing for revising the luminance conversion curve using the target dynamic range revised by said target dynamic range revising processing, wherein
- said target dynamic range revising processing revises the target dark luminance value and target bright luminance value, whereby the target dynamic range after revision will come to have a range width that has been widened by said range width widening processing; and
- revises the target bright luminance value and target dark luminance value such that ratio of the range width between the target representative luminance value and target dark luminance value to the range width of the dynamic range will agree with the ratio of the range width between the target representative luminance value and revised target dark luminance value to the range width of the revised target dynamic range, and such that the ratio of the range width between the target representative luminance value and target bright luminance value to the range width of the target dynamic range will agree with the ratio of the range width between the target representative luminance value and revised target bright luminance value to the range width of the revised target dynamic range.

* * * * *